US012531612B2

(12) United States Patent
Rom et al.

(10) Patent No.: US 12,531,612 B2
(45) Date of Patent: Jan. 20, 2026

(54) RADIO CHANNEL ANTENNA PATTERN MATCHING VIA CONFIGURABLE FRONT END MMWAVE MODULE

(71) Applicant: NOKIA TECHNOLOGIES OY, Espoo (FI)

(72) Inventors: Christian Rom, Aalborg (DK); Kim Nielsen, Storvorde (DK); Samantha Caporal Del Barrio, Aalborg (DK); Simon Svendsen, Aalborg (DK); Bent Henneberg Rysgaard, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 344 days.

(21) Appl. No.: 18/236,046

(22) Filed: Aug. 21, 2023

(65) Prior Publication Data

US 2024/0072859 A1    Feb. 29, 2024

Related U.S. Application Data

(60) Provisional application No. 63/404,436, filed on Sep. 7, 2022, provisional application No. 63/400,627, filed on Aug. 24, 2022.

(51) Int. Cl.
    *H04B 7/06*    (2006.01)
    *H04B 7/0408*  (2017.01)

(52) U.S. Cl.
    CPC ......... *H04B 7/0617* (2013.01); *H04B 7/0408* (2013.01); *H04B 7/0691* (2013.01); *H04B 7/0695* (2013.01)

(58) Field of Classification Search
    None
    See application file for complete search history.

(56) References Cited

U.S. PATENT DOCUMENTS

| 7,873,326 B2 * | 1/2011 | Sadr | H01Q 21/29 370/335 |
| 11,646,491 B2 * | 5/2023 | Tran | H01Q 1/246 343/721 |

(Continued)

FOREIGN PATENT DOCUMENTS

CN    2935678 Y    8/2007

OTHER PUBLICATIONS

Communication pursuant to Article 94(3) EPC dated Jul. 29, 2025, corresponding to European Patent Application No. 23192669.2.

(Continued)

*Primary Examiner* — Wilson Lee
(74) *Attorney, Agent, or Firm* — SQUIRE PATTON BOGGS (US) LLP

(57) ABSTRACT

Systems, methods, apparatuses, and computer program products for radio channel pattern matching. One method may include receiving, at an antenna panel, at least two configured transmission configuration indicator states for simultaneous multiple input multiple output reception; for each of the at least two configured transmission configuration indicator states for simultaneous reception from one or more transmission reception points, sweeping at least one narrow beam receiving one or more repeated reference signals received from the one or more transmission reception points; and, based upon at least one spatial radio multipath channel characteristic of the one or more repeated reference signals carrying each transmission configuration indicator state, selecting at least one antenna element of the antenna panel to form a group of antenna elements and control the group of antenna elements to direct at least one beam.

23 Claims, 28 Drawing Sheets

(56) References Cited

U.S. PATENT DOCUMENTS

| | | | |
|---|---|---|---|
| 2017/0156067 | A1 | 6/2017 | Huang |
| 2020/0266875 | A1* | 8/2020 | Zhou ..................... H04B 7/0628 |
| 2022/0400462 | A1* | 12/2022 | Dai ......................... G01S 11/04 |
| 2023/0421215 | A1* | 12/2023 | Duan ................... H04B 7/0417 |
| 2024/0414728 | A1* | 12/2024 | Matsumura ....... H04W 72/0457 |
| 2025/0167864 | A1* | 5/2025 | Makki ................ H04B 7/06952 |
| 2025/0261212 | A1* | 8/2025 | Li ......................... H04L 5/0053 |
| 2025/0274165 | A1* | 8/2025 | Manolakos ......... H04L 25/0224 |

OTHER PUBLICATIONS

Moderator (NTT Docomo, Inc.), "Moderator's summary for discussion [RAN95e-RAN4-R18Prep-02] FR2 RF Enhancements", 3GPP TSG-RAN Meeting#95-e, draft RP-220020, Electronic Meeting, Mar. 17-23, 2022, XP052109051.

3GPP TS 38.212 V17.2.0 (Jun. 2022), Technical Specification, 3rd Generation Partnership Project; Technical Specification Group Radio Access Network; NR; Multiplexing and channel coding (Release 17), Jun. 2022.

3GPP TS 38.214 V17.2.0 (Jun. 2022), Technical Specification, 3rd Generation Partnership Project; Technical Specification Group Radio Access Network; NR; Physical layer procedures for data (Release 17), Jun. 2022.

Qualcomm Incorporated, "Revised WID: Requirement for NR frequency range 2 (FR2) multi-Rx chain DL reception," RP-221753, 3GPP TSG RAN Meeting #96, Budapest, Hungary, Jun. 6-9, 2022.

Book: "Fundamentals of Wireless Communication," David Tse et al., section 7.1.2 and 7.3.5, Dec. 9, 2004.

Extended European Search Report dated Feb. 12, 2024, corresponding to European Patent Application No. 23192669.2.

Characterization of Implemented Algorithm for MIMO Spatial Multiplexing in Reverberation Chamber—IEEE Transactions on Antennas and Propagation, vol. 61, No. 8, Aug. 2013.

* cited by examiner

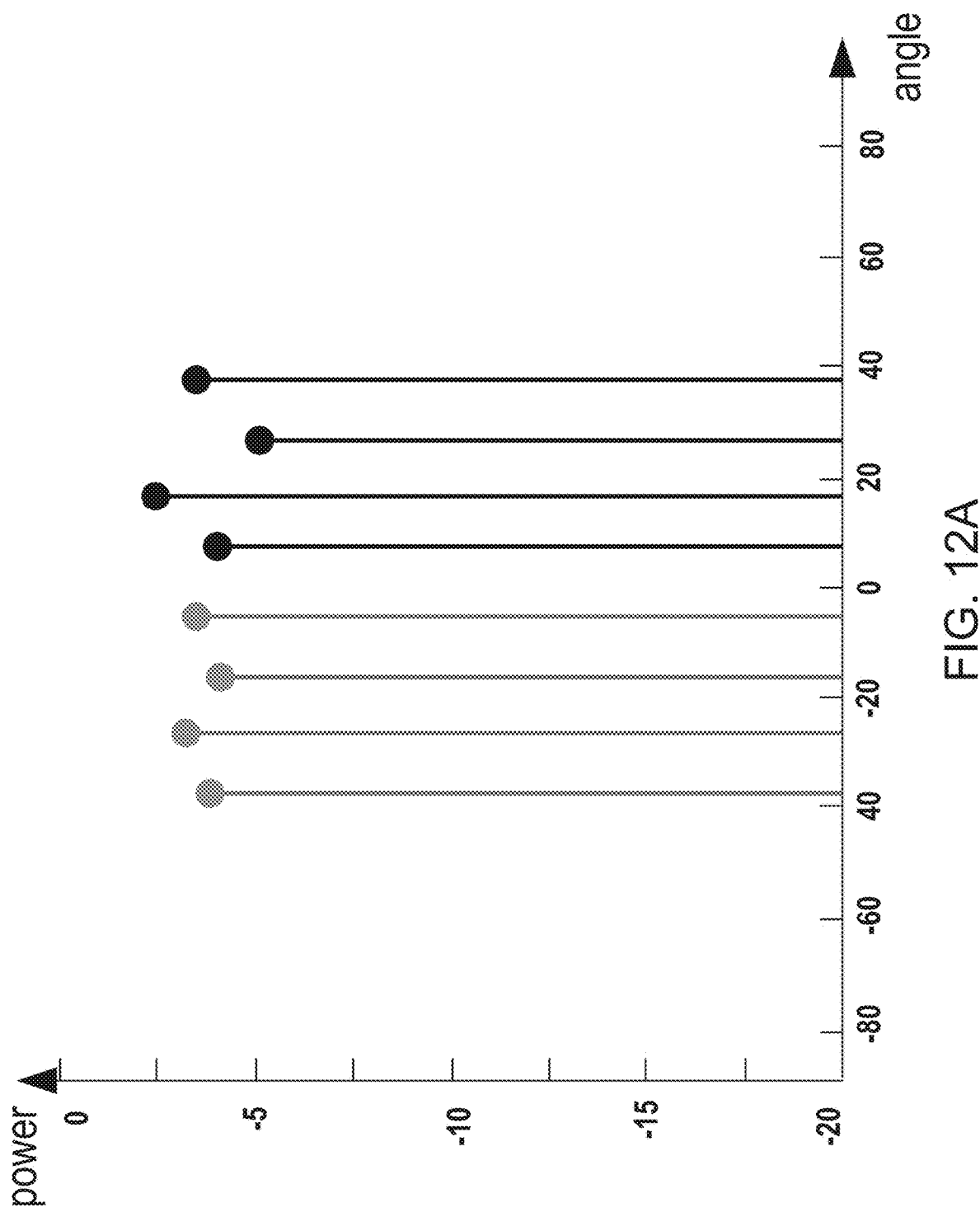

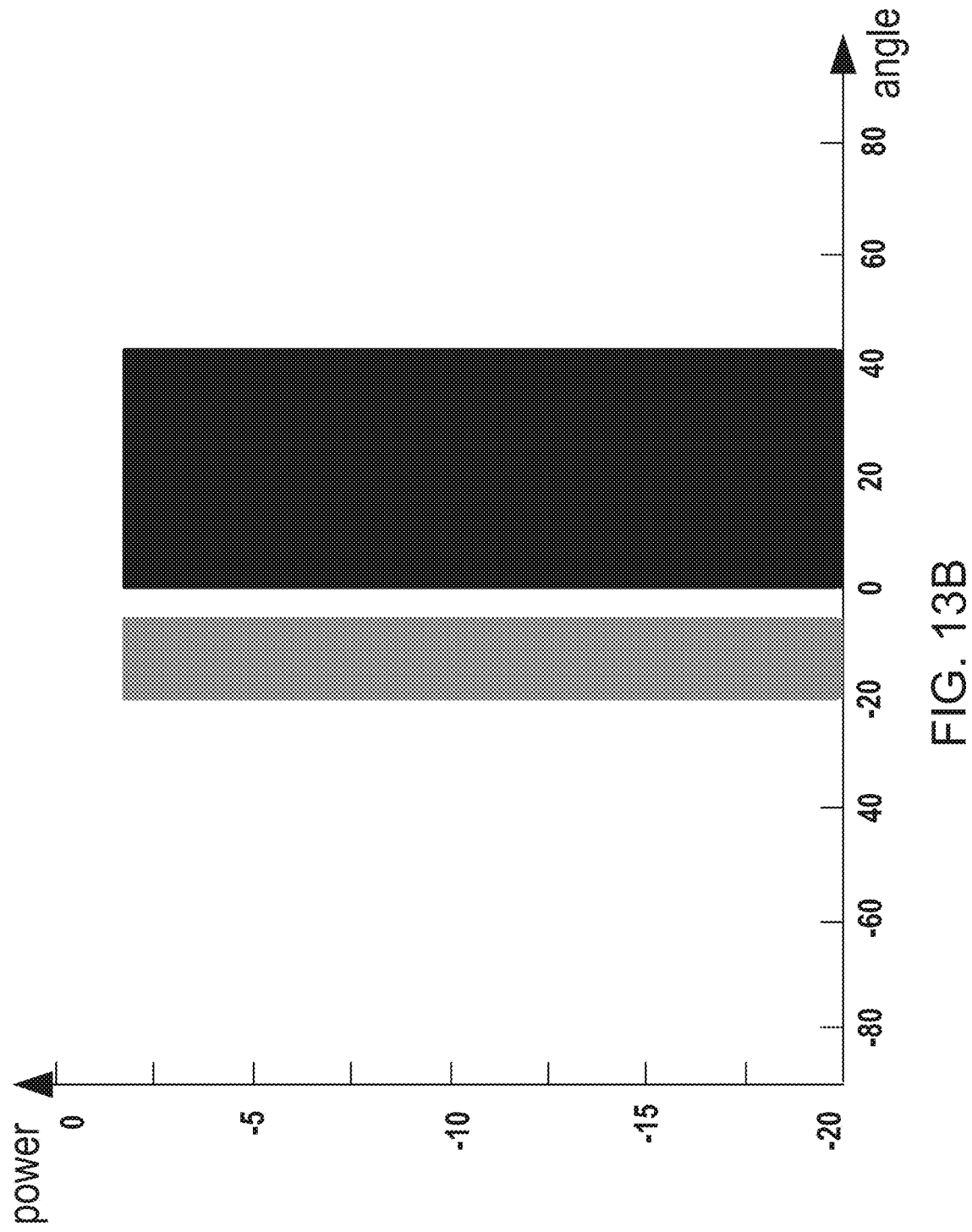

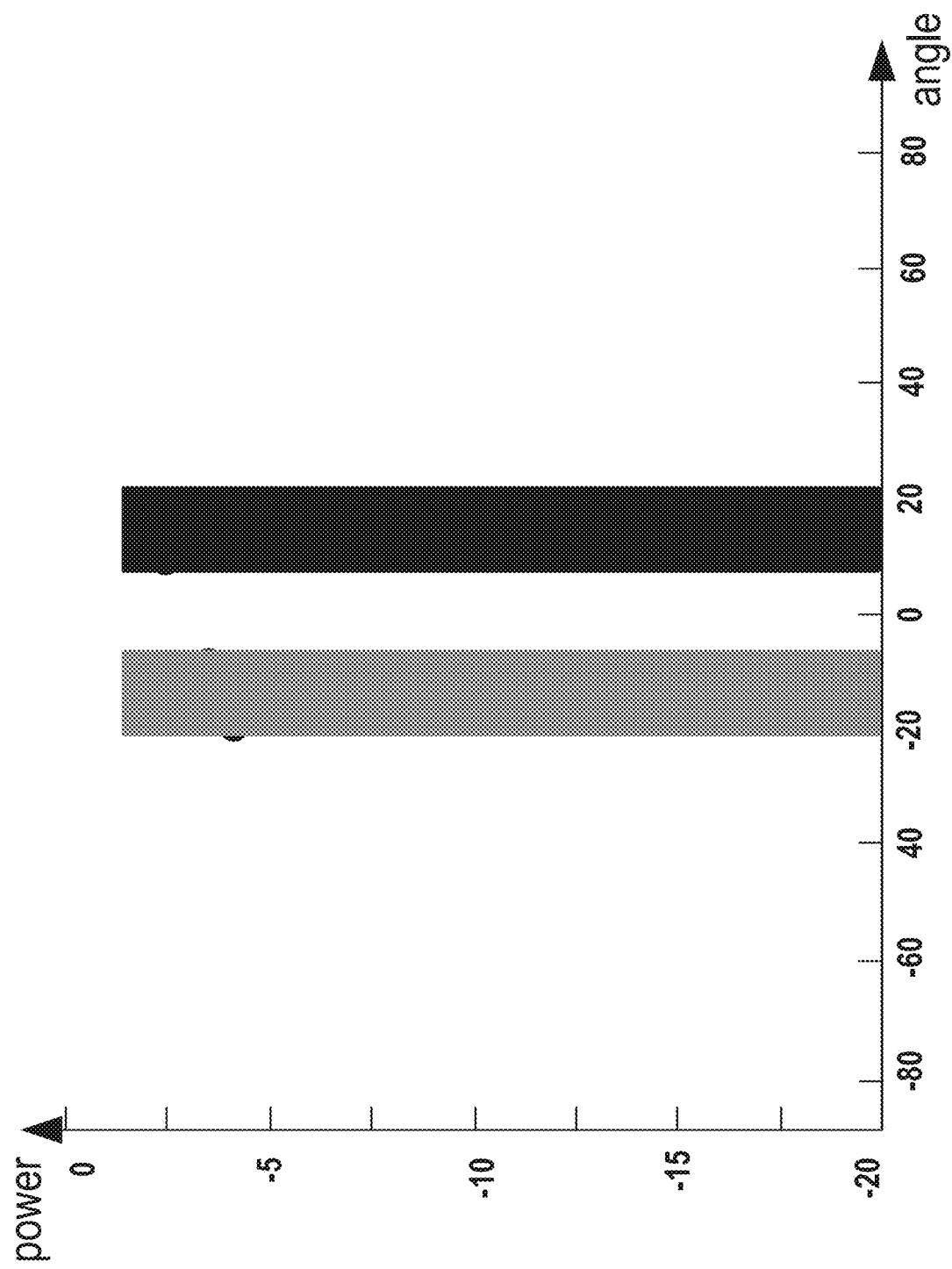

RADIO CHANNEL ANTENNA PATTERN MATCHING VIA CONFIGURABLE FRONT END MMWAVE MODULE

CROSS REFERENCE TO RELATED APPLICATIONS

This application claims the benefit of U.S. Provisional Patent Application No. 63/400,627, filed Aug. 24, 2022, and U.S. Provisional Patent Application No. 63/404,436, filed Sep. 7, 2022. The entire contents of these applications are hereby incorporated by reference.

TECHNICAL FIELD

Some example embodiments may generally relate to mobile or wireless telecommunication systems, such as $3^{rd}$ Generation Partnership Project (3GPP) Long Term Evolution (LTE), $5^{th}$ generation (5G) radio access technology (RAT), new radio (NR) access technology, $6^{th}$ generation (6G), and/or other communications systems. For example, certain example embodiments may relate to systems and/or methods for antenna reconfiguration of split panel arrays.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, at an antenna panel, at least two configured transmission configuration indicator states for simultaneous multiple input multiple output reception. The method may further include, for each of the at least two configured transmission configuration indicator states for simultaneous reception from one or more transmission reception points, sweeping at least one narrow beam receiving one or more repeated reference signals received from the one or more transmission reception points. The method may further include, based upon at least one spatial radio multipath channel characteristic of the one or more repeated reference signals carrying each transmission configuration indicator state, selecting at least one antenna element of the antenna panel to form a group of antenna elements and control the group of antenna elements to direct at least one beam.

In accordance with certain example embodiments, an apparatus may include means for receiving, at an antenna panel, at least two configured transmission configuration indicator states for simultaneous multiple input multiple output reception. The apparatus may further include means for, for each of the at least two configured transmission configuration indicator states for simultaneous reception from one or more transmission reception points, sweeping at least one narrow beam receiving one or more repeated reference signals received from the one or more transmission reception points. The apparatus may further include means for, based upon at least one spatial radio multipath channel characteristic of the one or more repeated reference signals carrying each transmission configuration indicator state, selecting at least one antenna element of the antenna panel to form a group of antenna elements and control the group of antenna elements to direct at least one beam.

In accordance with various example embodiments, a non-transitory computer readable medium may include program instructions that, when executed by an apparatus, cause the apparatus to perform at least a method. The method may include receiving, at an antenna panel, at least two configured transmission configuration indicator states for simultaneous multiple input multiple output reception. The method may further include, for each of the at least two configured transmission configuration indicator states for simultaneous reception from one or more transmission reception points, sweeping at least one narrow beam receiving one or more repeated reference signals received from the one or more transmission reception points. The method may further include, based upon at least one spatial radio multipath channel characteristic of the one or more repeated reference signals carrying each transmission configuration indicator state, selecting at least one antenna element of the antenna panel to form a group of antenna elements and control the group of antenna elements to direct at least one beam.

In accordance with some example embodiments, a computer program product may perform a method. The method may include receiving, at an antenna panel, at least two configured transmission configuration indicator states for simultaneous multiple input multiple output reception. The method may further include, for each of the at least two configured transmission configuration indicator states for simultaneous reception from one or more transmission reception points, sweeping at least one narrow beam receiving one or more repeated reference signals received from the one or more transmission reception points. The method may further include, based upon at least one spatial radio multipath channel characteristic of the one or more repeated reference signals carrying each transmission configuration indicator state, selecting at least one antenna element of the antenna panel to form a group of antenna elements and control the group of antenna elements to direct at least one beam.

In accordance with certain example embodiments, an apparatus may include at least one processor and at least one memory storing instructions that, when executed by the at least one processor, cause the apparatus at least to receive, at an antenna panel, at least two configured transmission configuration indicator states for simultaneous multiple input multiple output reception. The at least one memory and instructions, when executed by the at least one processor, may further cause the apparatus at least to, for each of the at least two configured transmission configuration indicator states for simultaneous reception from one or more transmission reception points, sweep at least one narrow beam receiving one or more repeated reference signals received from the one or more transmission reception points. The at least one memory and instructions, when executed by the at least one processor, may further cause the apparatus at least to, based upon at least one spatial radio multipath channel characteristic of the one or more repeated reference signals carrying each transmission configuration indicator state, select at least one antenna element of the antenna panel to form a group of antenna elements and control the group of antenna elements to direct at least one beam.

In accordance with various example embodiments, an apparatus may include receiving circuitry configured to receive, at an antenna panel, at least two configured transmission configuration indicator states for simultaneous multiple input multiple output reception. The apparatus may further include sweeping circuitry configured to, for each of the at least two configured transmission configuration indicator states for simultaneous reception from one or more transmission reception points, sweep at least one narrow beam receiving one or more repeated reference signals received from the one or more transmission reception points. The apparatus may further include selecting circuitry configured to, based upon at least one spatial radio multipath channel characteristic of the one or more repeated reference signals carrying each transmission configuration indicator state, select at least one antenna element of the antenna panel to form a group of antenna elements and control the group of antenna elements to direct at least one beam.

BRIEF DESCRIPTION OF THE DRAWINGS

For a proper understanding of example embodiments, reference should be made to the accompanying drawings, wherein:

FIG. 12A depicts an example of aggregated channel power angular profiles (PAPs) per TCI according to certain example embodiments;

FIG. 13B illustrates another example of desired antenna angular ranges according to various example embodiments;

FIG. 13C illustrates another example of desired antenna angular ranges according to various example embodiments;

DETAILED DESCRIPTION

Figure 1B:
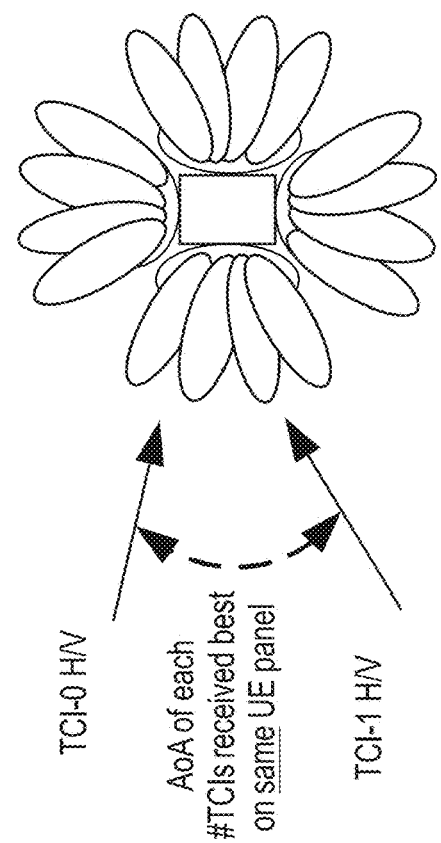
FIG. 1B illustrates another example use case of multi-panel user equipment 4-layer reception.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for antenna reconfiguration of split panel arrays is not intended to limit the scope of certain example embodiments, but is instead representative of selected example embodiments.

3GPP recently introduced 4-layer downlink (DL)-multiple input multiple output (MIMO) in mmwave frequency range (FR2) range (24.5 GHz-42 GHz), including DL transmission schemes with simultaneous and non-simultaneous multi-beam reception from multiple transmission reception points (TRPs)/antenna panels. The simultaneous reception may require support of simultaneous multi-panel operation with several independent RX beams/chains on the UE side. As part of this, a FR2 UE capability for simultaneous multi-beam reception (simultaneousReceptionDiffTypeD-r16) may be used; however, Rel-16 and Rel-17 do not define RF, radio resource management (RRM), nor performance requirements for FR2 UEs with simultaneousReceptionDiffTypeD-r16 capabilities. Enhanced NR FR2 UEs with multi-beam simultaneous reception and multiple RX chains may improve performance in FR2, in terms of both demodulation performance (4-layer DL MIMO), RRM performance, and RF spherical coverage. Such requirements for UEs capable of multi-beam/chain simultaneous DL reception on a single component carrier could improve RF, RRM, and UE demodulation performance.

When a UE is configured with higher layer parameter NZP-CSI-RS-ResourceSet, and when the higher layer parameter repetition is set to 'off,' the UE may determine a channel state information resource indicator (CRI) from the supported set of CRI values, and report the number in each CRI report. Similarly, when the UE is configured with higher layer parameter NZP-CSI-RS-ResourceSet, and when the higher layer parameter repetition is set to 'off,' the UE may determine a CRI from the supported set of CRI values, and report the number in each CRI report. When the higher layer parameter repetition for a CSI-RS resource set for channel measurement is set to 'on,' CRI for the CSI-RS resource set for channel measurement may not be reported.

In general, CSIs may include any of a channel quality indicator (CQI) and rank indicator (RI), which may be reported together. CQI can then be calculated based on the reported RI. If a UE is configured with a CSI-ReportConfig with the higher layer parameter reportQuantity set to 'cri-RI-CQI,' and if the UE is configured with higher layer parameter non-PMI-PortIndication contained in a CSI-ReportConfig, reports may be indicated in the order of layer ordering for rank r, and each CSI-RS resource in the CSI resource setting may be linked to the CSI-ReportConfig based on the order of the associated NZP-CSI-RS-ResourceId in the linked CSI resource setting for channel measurement, given by higher layer parameter resourcesForChannelMeasurement. The configured higher layer parameter non-PMI-PortIndication may then contain a sequence $p_0^{(1)}, p_0^{(2)}, p_1^{(2)}, p_0^{(3)}, p_1^{(3)}, p_2^{(3)}, \ldots, p_0^{(R)}, p_1^{(R)}, \ldots, p_{R-1}^{(R)}$ of port indices, where $p_0^{(v)}, \ldots, p_{v-1}^{(v)}$ are the CSI-RS port indices associated with rank v, and R∈{1, 2, . . . , P}, where P∈{1, 2, 4, 8} is the number of ports in the CSI-RS resource. The UE may only report RI corresponding with the configured fields of PortIndexFor8Ranks. If the UE is not configured with higher layer parameter non-PMI-PortIndication, the UE may assume, for each CSI-RS resource in the CSI resource setting linked to the CSI-ReportConfig, that the CSI-RS port indices $p_0^{(v)}, \ldots, p_{v-1}^{(v)}$={0, . . . , v−1} are associated with ranks v=1, 2, . . . , P, where P∈{1, 2, 4, 8} is the number of ports in the CSI-RS resource. If the UE is configured with the higher layer parameter groupBasedBeamReporting set to 'enabled,' the UE may not be required to update measurements for more than 64 CSI-RS and/or synchronization signal block (SSB) resources. The UE may also report, in a single reporting instance, two different CRIs or synchronization signal/physical broadcast channel resource block indicators (SSBRIs) for each report setting, where CSI-RS and/or SSB resources may be received simultaneously by the UE either with a single spatial domain receive filter, or with multiple simultaneous spatial domain receive filters. If the UE is configured with the higher layer parameter groupBasedBeamReporting-r17, the UE may not be required to update measurements for more than 64 CSI-RS and/or SSB resources, and the UE may report, in a single reporting instance, nrofReportedRSgroup (if configured), group(s) of two CRIs or SSBRIs selecting one CSI-RS or SSB from each of the two CSI resource sets for the report setting. CSI-RS and/or SSB resources of each group may be received by the UE simultaneously.

Figure 1A:
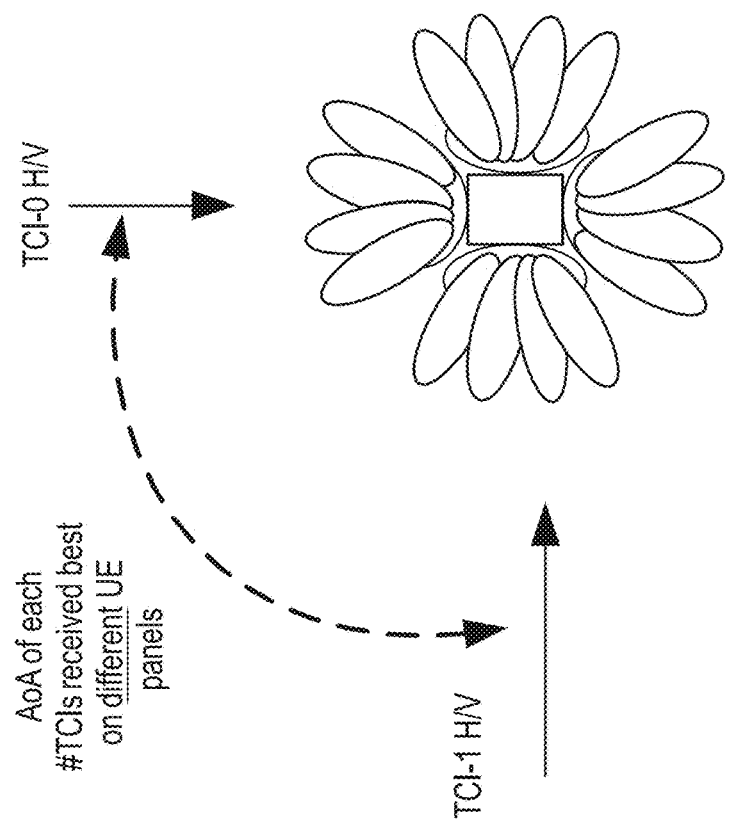
FIG. 1A illustrates an example use case of multi-panel user equipment 4-layer reception.

FIG. 1 illustrates two examples of use cases. In particular, FIG. 1A depicts 2 independent panels "pointing" in the direction of the angles of arrival (AoAs) of each TCI-horizontal polarization (H)/vertical polarization (V), where a UE would most effectively receive each TCI on an independent UE panel. In FIG. 1B, the UE may most effectively receive both TCIs on the same panel, creating a need for an architecture and process that can properly handle the incoming streams. As discussed herein, a panel may refer to a mmWave antenna module, including at least one or all antenna elements.

Certain example embodiments described herein may have various benefits and/or advantages to overcome the disadvantages described above. For example, certain example embodiments may increase the value of the RI reported by the UE under the periodic or semi-persistent CSI measurements. For PDSCH, given a set of radio channel conditions and 4-layer downlink FR2 beam configurations, some example embodiments may enable the UE to maximize the invertibility of the H matrix, and thus minimize the block error rate (BLER)/HARQ acknowledgements. For CSI reporting, given a set of radio channel conditions and 4-layer downlink FR2 beam configurations, certain example embodiments may enable the UE to maximize the possible rank indicator value.

Figure 2:
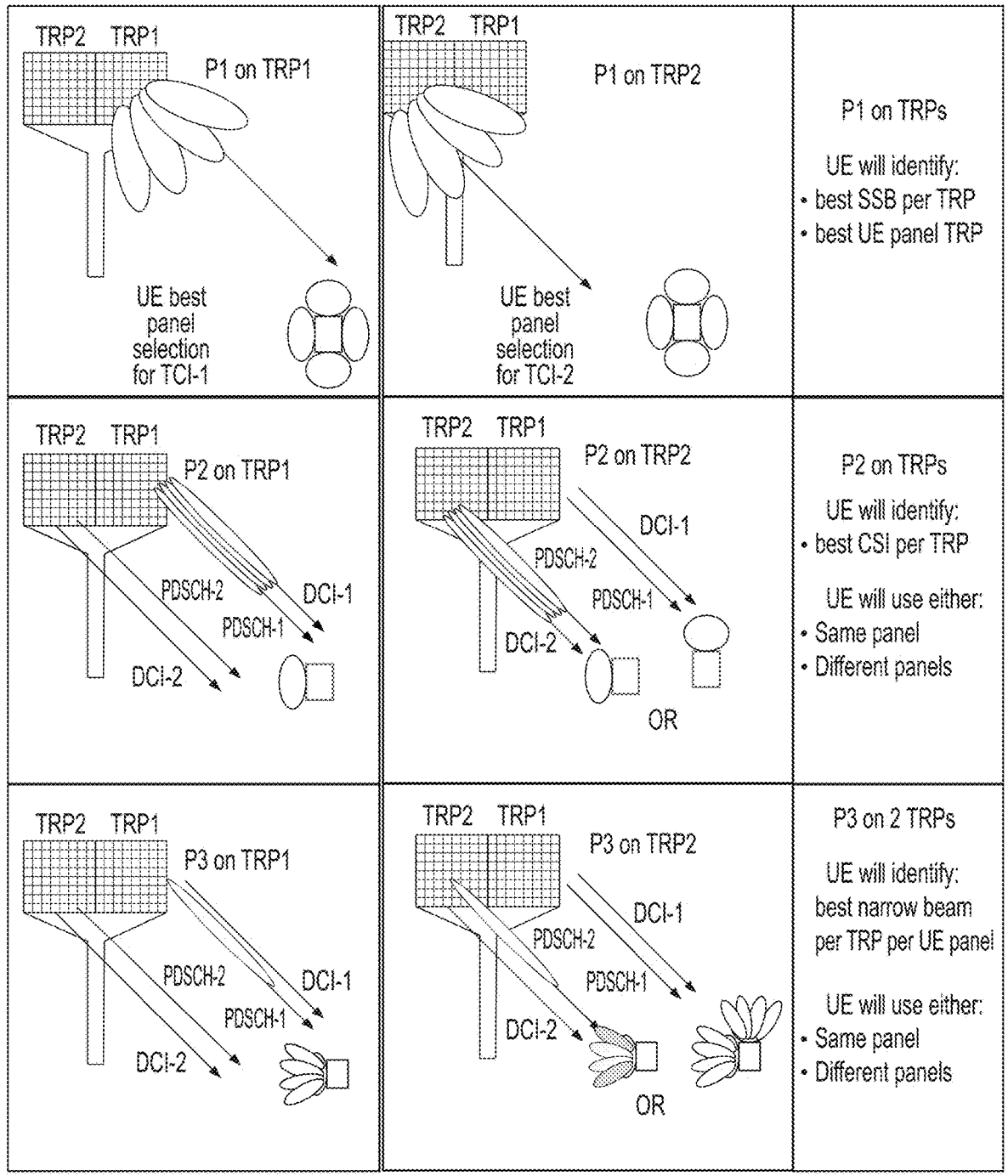
FIG. 2 illustrates an example of a beam alignment procedure.

FIG. 2 summarizes three phases of the phases during initial access. In phase 1, the UE may perform measurements based on periodic SSB burst transmissions for selection of the best wide gNB beams, with a typical periodicity of 20 ms. Phase 1 in FIG. 2 may be performed on TRP1 and TRP2. The UE may select its best panel for TRP1, where all TCIs from TPR1 would share the same CORESETPoolIndex. The UE may then select its best panel for TRP2 across all received SSB blocks from TRP2 where all TCIs from each TRP shares the same CORESETPoolIndex from TRP2. The best UE panel for TRP1 signals may be the same or different as the best UE panel for TRP2. In phase 2, the UE may perform measurements based on CSI-RS sweep from the base station using narrower beams and/or beams with steering vectors in between the ones from the SSB beams. This may be performed for TRP1, and then for TRP2. At phase 3, the UE may perform measurements based on a repeated aperiodic CSI-RS with repetition set to ON (up to 8 repetitions). For each TRP, a repetition sequence may have been sent in order for the UE to perform its narrow beam sweep (i.e., receiving repeated RSs). The UE may then sweep on either two different panels or the same panel.

A richer multipath environment may result with a higher probability for a higher rank. Thus, during phase 3, the number of cluster rays per narrow beam may be mapped, specifically by performing an angular-to-time domain mapping and then counting taps. For example, radio multipath channels may be estimated in a channel estimation module in the baseband of a UE. This module may map reference symbols in frequency domain into delay estimates (i.e., channel impulse response taps); more taps may be associated with better MIMO performance. The beams may be scaled to have rank over power, with the number of rays over signal-to-noise ratio (SNR). This may allow the UE to detect a higher rank, and move to 4-layer MIMO. Upon completion of the process, the UE may have information of the CSI-RS strength on several beams (as shown at phase 3), which the UE may use to determine separate channels at different AoA with an associated signal strength (angle and strength).

Figure 3:
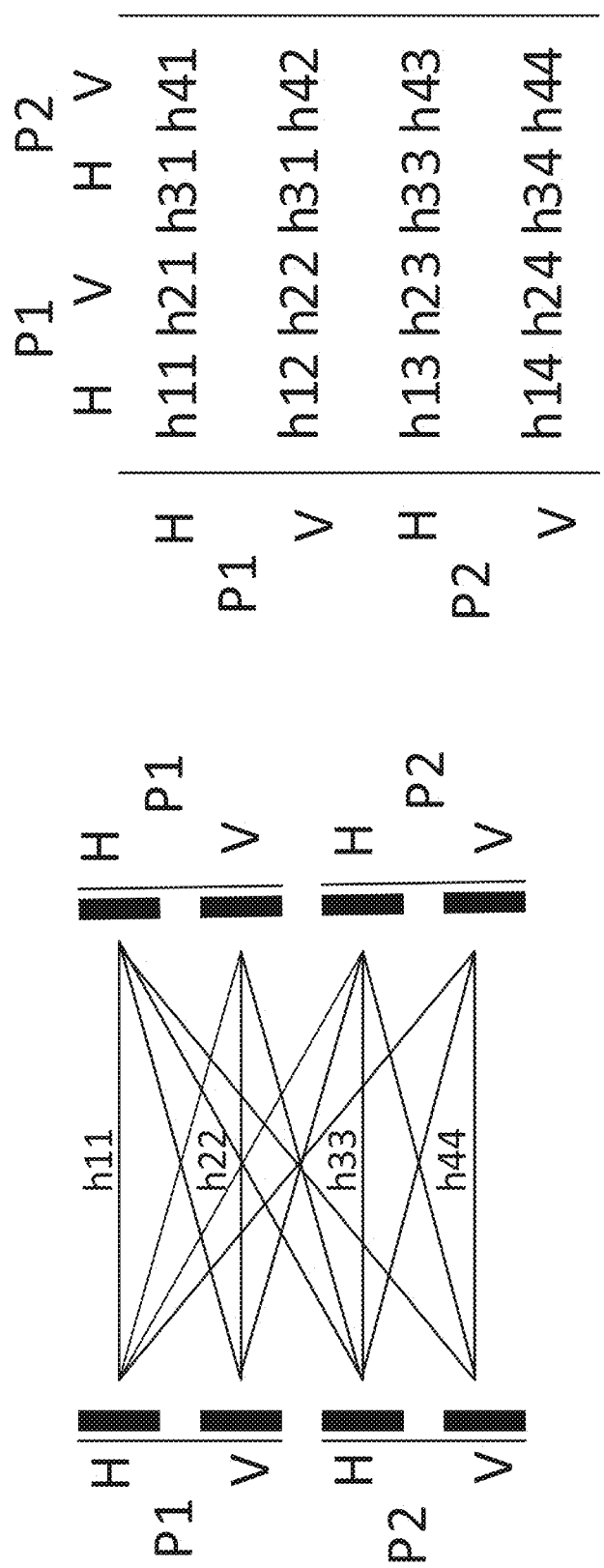
FIG. 3 illustrates an example of port mapping and an H matrix for a 4-layer frequency range (FR2) system.
Figure 4:
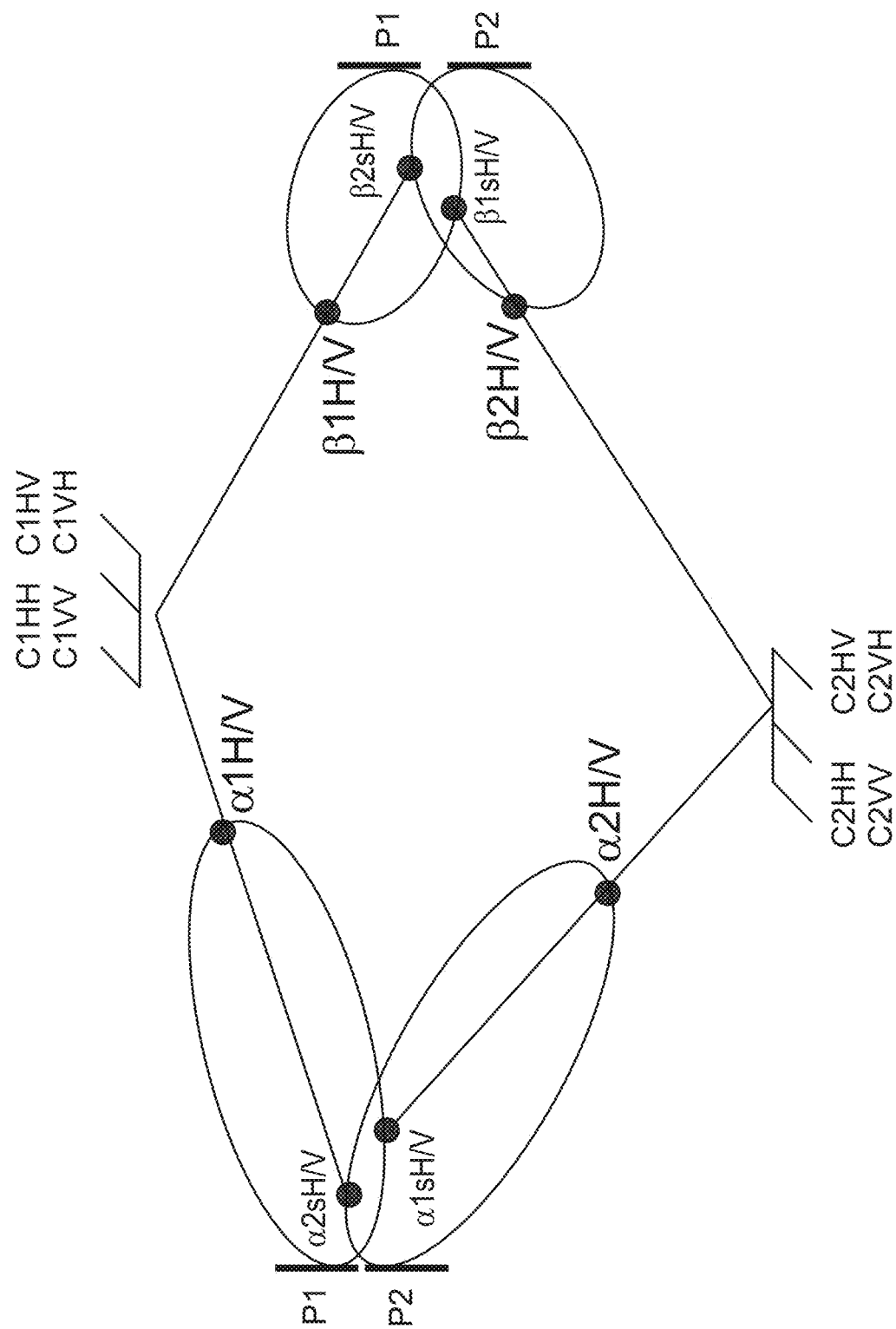
FIG. 4 depicts a conceptual representation of a 4-layer downlink system with 2 panels or subpanels at both a transmitter (Tx) and receiver (Rx)

FIG. 3 depicts a model of 4 TX antenna ports mapped onto 2 TX panels, with horizontal and vertical polarization. Similarly, on the RX side, 4 ports can be mapped onto 2 RX panels with horizontal and vertical polarization. FIG. 3 also provides some coefficients of the H matrix in FIG. 2, applied in the system of FIG. 4, with a 2-cluster channel model with 4 coefficients covering H=>H, H=>V, V=>H and V=>V polarization combinations (i.e., C1HH, . . . , C2VV); TX beam gain coefficients per panel per polarization per angle of departure (i.e., alpha coefficients); and RX beam gain coefficients per panel per polarization per angle of arrival (beta coefficients). The overall detailed model can then be expressed as shown in the table below, wherein the diagonal elements represent the desired signal, and the other elements can be seen as undesired interstream coupling.

cluster angular spread of the incoming signals at the UE on a single panel at the UE. Furthermore, challenges remain with determining how the UE matches the estimated physical radio channel from phase one in FIG. 2 to select the best possible antenna configuration, and control the beamwidth/direction in order to maximize the number of spatial multiplexing data streams that the UE will be able to report (e.g., via rank indicator) and decode successfully (via physical downlink shared channel (PDSCH) hybrid automatic repeat request (HARQ) acknowledgements).

Various example embodiments may also include determining the preferred antenna configuration that supports 4-layer MIMO reception, thereby maximizing the throughput performance of the PDSCH channel; matching the array beamwidth to the channel angular spread and to maximize the number of multipath components per TCI layer, thereby maximizing the likelihood of highest channel rank; and matching the per array beam gains to the TCI-layer aggregated power levels, thereby allowing for a balanced received power level between layers. Furthermore, the UE storing pre-characterized array configuration parameters that may be applied according to network measurements and MIMO operation can provide for a straightforward cost-efficient $h_{11} = \alpha_1 H^* C_1 HH^* \beta_1 H + \alpha_1 s H^* C_2 HH^* \beta_1 s H$   $h_{31} = \alpha_1 H^* C_1 HH^* \beta_2 s H + \alpha_1 s H^* C_2 HH^* \beta_2 H$
$h_{12} = \alpha_1 H^* C_1 HV^* \beta_1 V + \alpha_1 s H^* C_2 HV^* \beta_1 s V$   $h_{41} = \alpha_1 H^* C_1 HV^* \beta_2 s V + \alpha_1 s H^* C_2 HV^* \beta_2 V$
$h_{21} = \alpha_1 V^* C_1 VH^* \beta_1 H + \alpha_1 s V^* C_2 VH^* \beta_1 s H$   $h_{32} = \alpha_1 V^* C_1 VH^* \beta_2 s V + \alpha_1 s V^* C_2 VV^* \beta_2 V$
$h_{22} = \alpha_1 V^* C_1 VV^* \beta_1 V + \alpha_1 s V^* C_2 VV^* \beta_1 s V$   $h_{42} = \alpha_1 V^* C_1 VV^* \beta_2 s V + \alpha_1 s V^* C_2 VV^* \beta_2 V$
$h_{13} = \alpha_2 H^* C_2 HH^* \beta_1 s H + \alpha_2 s H^* C_1 HH^* \beta_1 H$   $h_{33} = \alpha_2 s H^* C_1 HH^* \beta_2 s H + \alpha_2 H^* C_2 HH^* \beta_2 H$
$h_{23} = \alpha_2 H^* C_2 HV^* \beta_1 s V + \alpha_2 s H^* C_1 HV^* \beta_1 V$   $h_{34} = \alpha_2 s H^* C_1 HV^* \beta_2 s V + \alpha_2 H^* C_2 HV^* \beta_2 V$
$h_{14} = \alpha_2 V^* C_2 VH^* \beta_1 s H + \alpha_2 s V^* C_1 VH^* \beta_1 H$   $h_{43} = \alpha_2 s V^* C_1 VH^* \beta_2 s H + \alpha_2 V^* C_2 VH^* \beta_2 H$
$h_{24} = \alpha_2 V^* C_2 VV^* \beta_1 s V + \alpha_2 s V^* C_1 VV^* \beta_1 V$   $h_{44} = \alpha_2 s V^* C_1 VV^* \beta_2 s V + \alpha_2 V^* C_2 VV^* \beta_2 V$ A cluster may "carry" the main energy of each TRP signal, and the number of total data streams that can be transmitted on 2 TRPs simultaneously may depend on the number of MPCs present in each cluster and received on each UE beam. A cluster may consist of a single MPC (e.g., due to a single building reflection) and/or a multitude of MPCs (e.g., due to several building reflections, diffractions of scatterers).

Figure 5A:
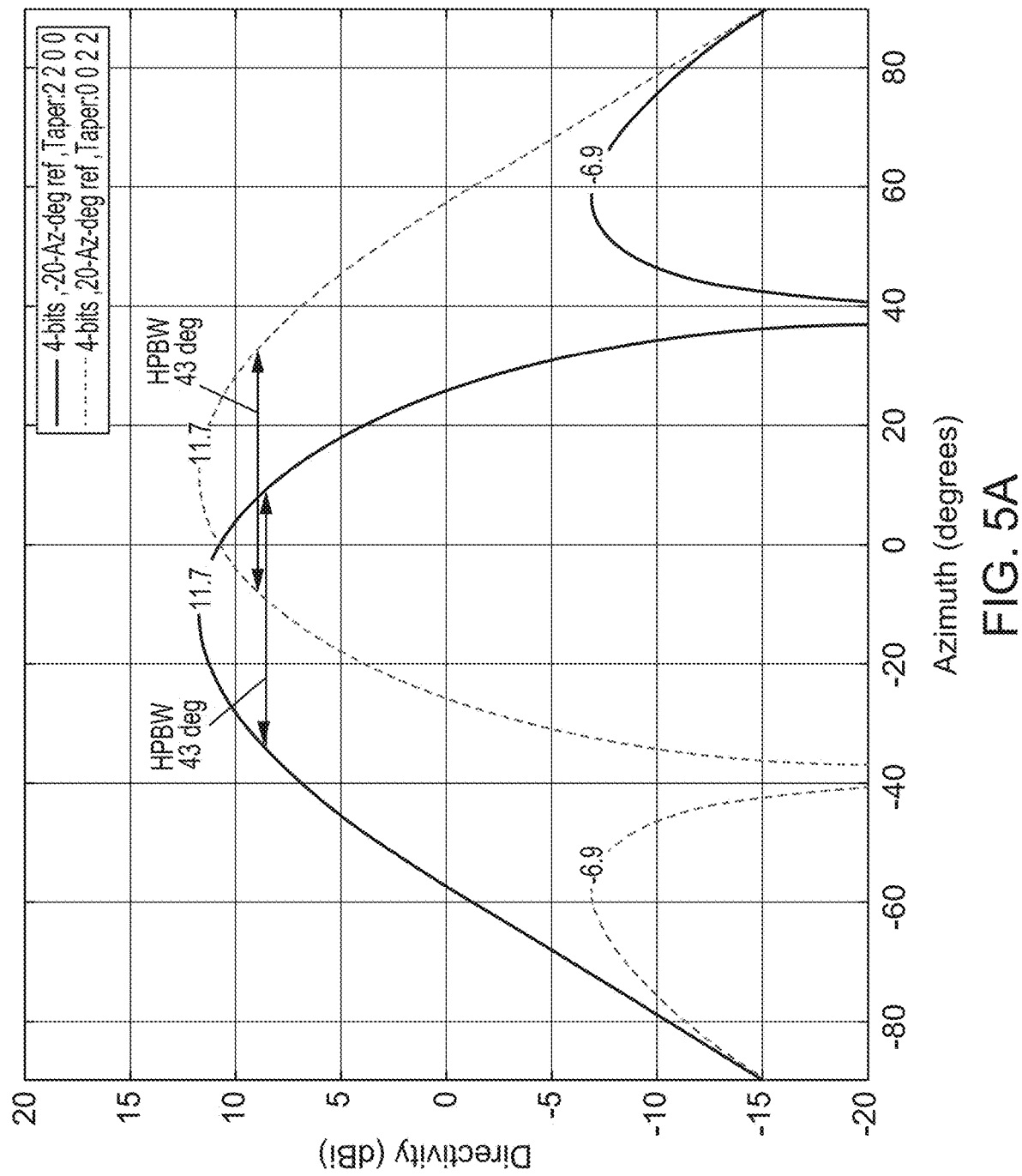
FIG. 5A illustrates a simulated example of 2-dimensional radiation patterns for different patch linear array configurations.
Figure 5B:
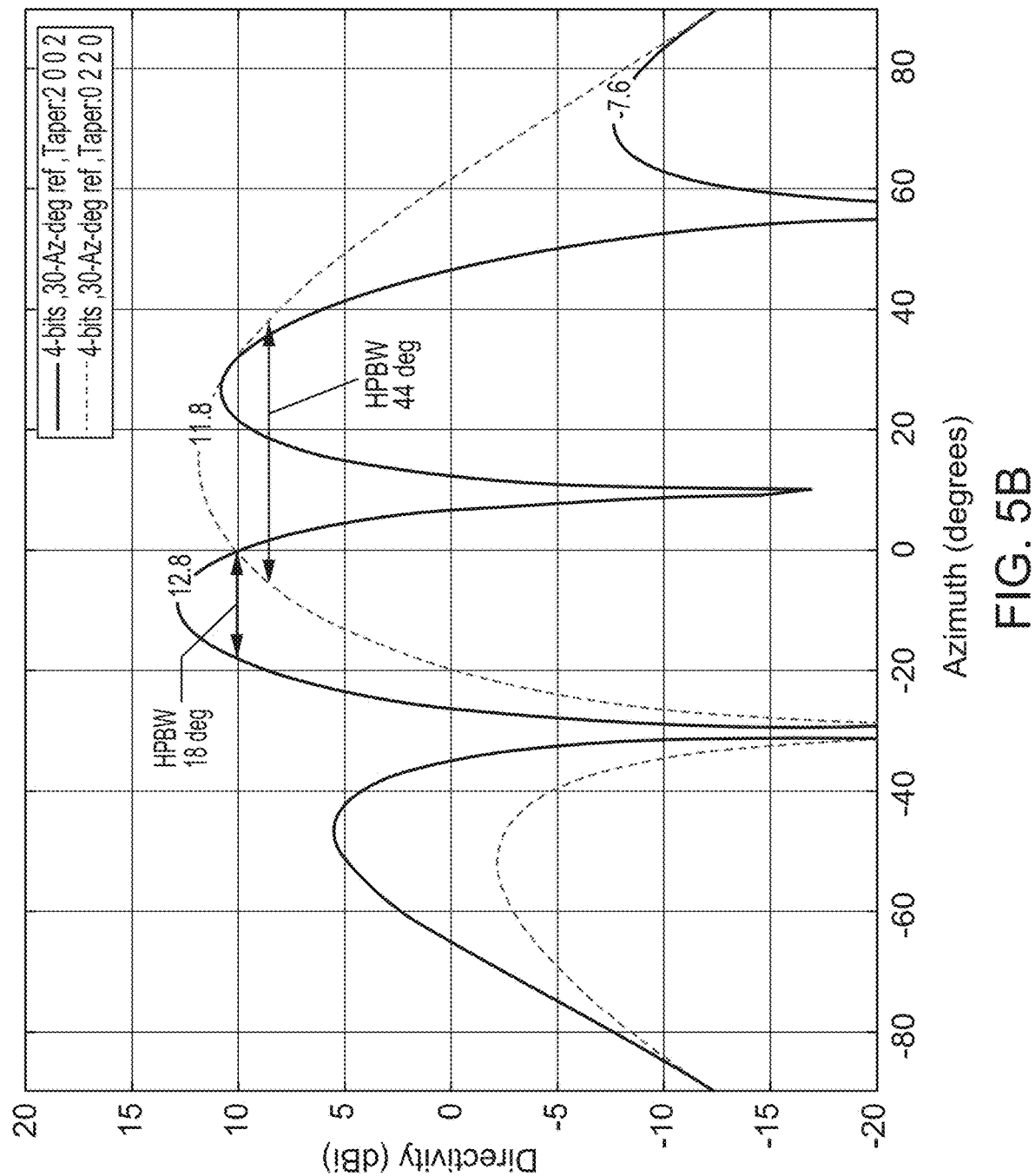
FIG. 5B illustrates another simulated example of 2-dimensional radiation patterns for different patch linear array configurations.
Figure 5C:
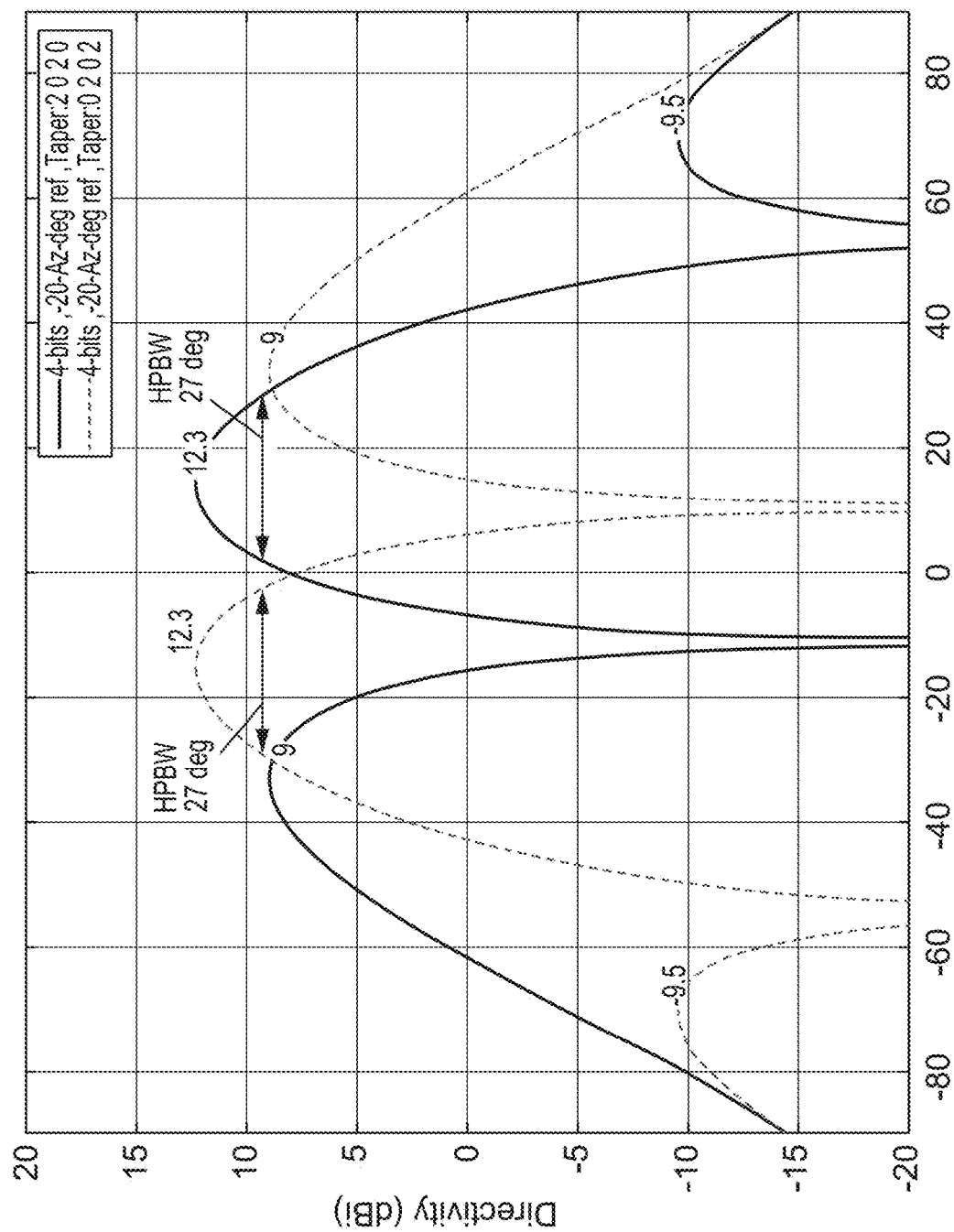
FIG. 5C illustrates another simulated example of 2-dimensional radiation patterns for different patch linear array configurations.
Figure 5D:
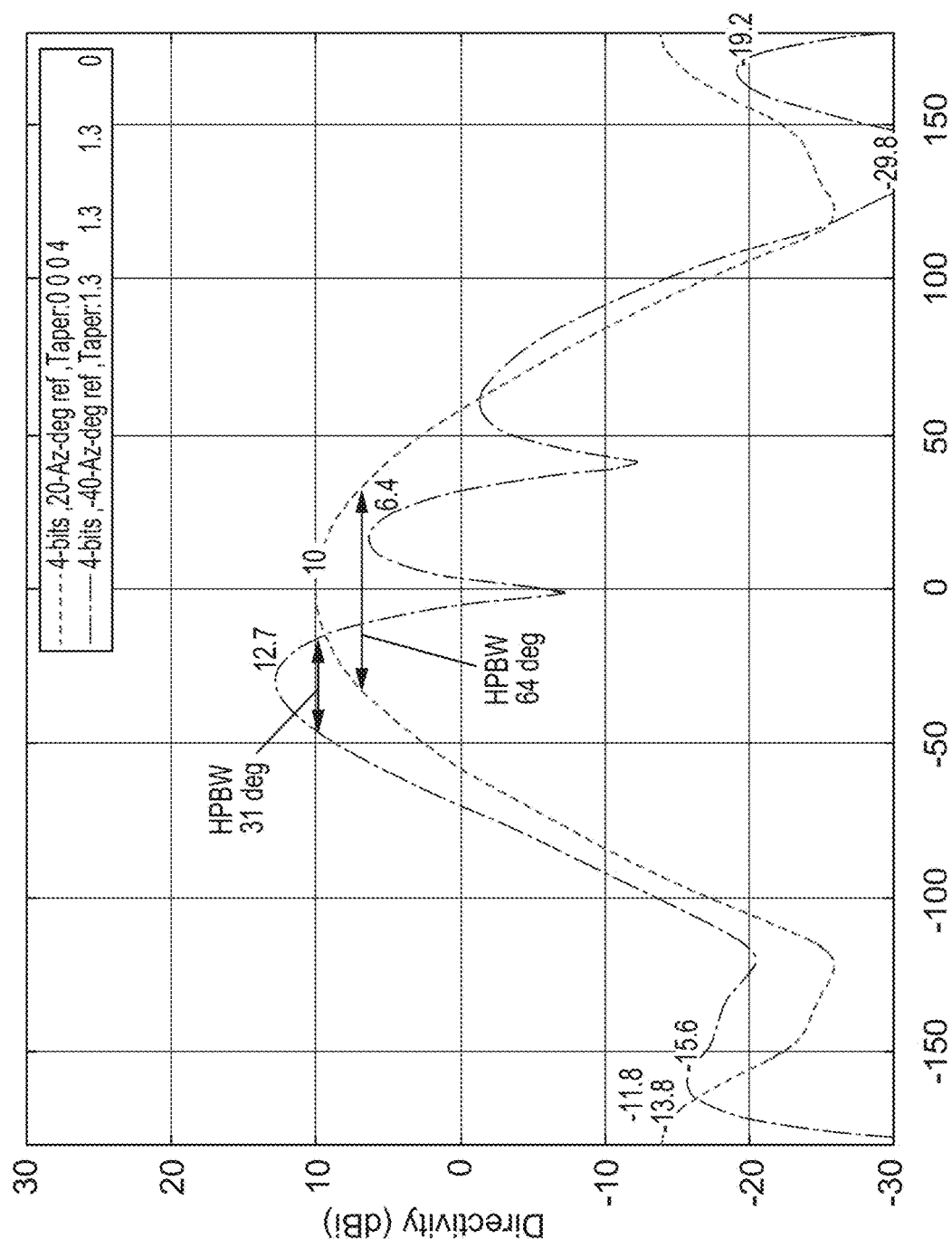
FIG. 5D illustrates another simulated example of 2-dimensional radiation patterns for different patch linear array configurations.

FIGS. 5A-D illustrate different simulated examples of 2-dimensional radiation patterns for a different patch linear array configuration. Each array configuration may be associated with a different half power beam width (HPBW), which may vary in the range from 18 to 64 degrees in the examples shown in FIGS. 5A-D. In particular, FIG. 5A shows Config1 of array element 1100-0011 grouping, HPBW of 43 degrees for both beams; FIG. 5B shows Config2 or array element 1000-0001 grouping, HPBW of 18 and 44 degrees for each beam; FIG. 5C shows Config3 of array element 1010-0101 grouping, HPBW of 27 degrees for both beams; and FIG. 5D shows Config4 of array element 1001-1001 grouping, HPBW of 31 and 64 degrees for each beam.

Figure 6:
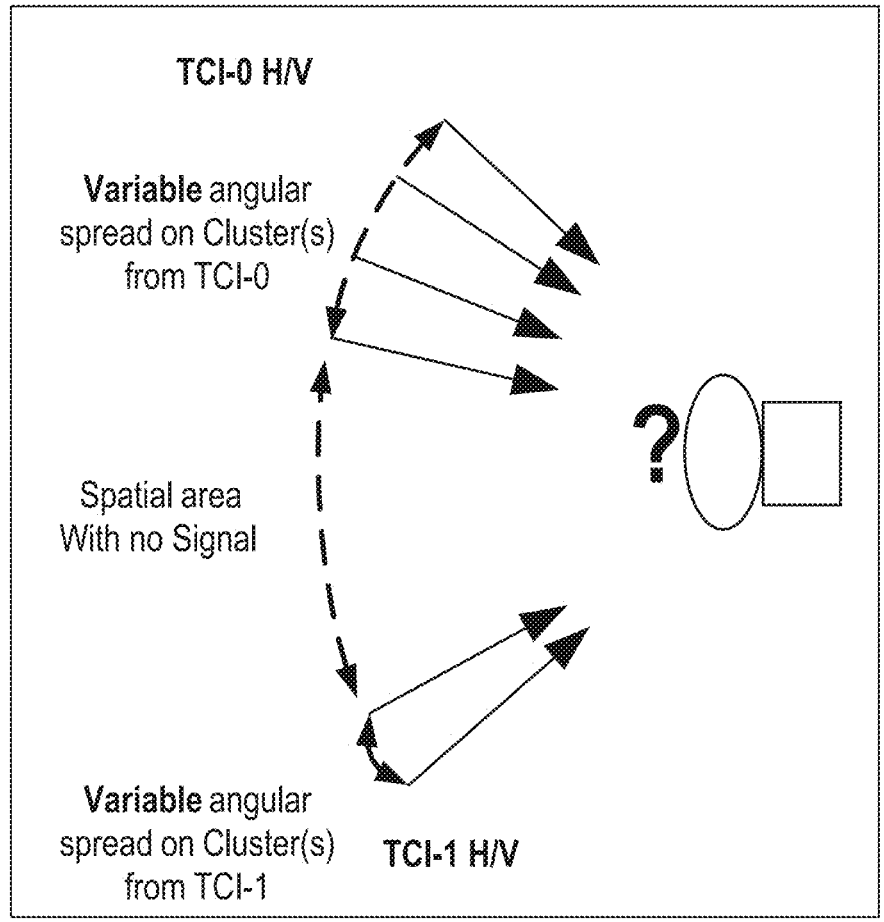
FIG. 6 illustrates an example of different channel conditions with different optimal matching beam configurations.

Challenges remain with an initial step of how the UE will characterize the physical radio channel between the TRPs from the base station (e.g., eNB, gNB) to the UE mmWave array. The context of this radio channel characterization may use this information in order to create a "desired antenna pattern pair" per sub-array to allow for maximum radio channel multipath richness. This richness could enable the rows and columns of the H matrix to be sufficiently independent to allow for a good condition number. A richer channel (in terms of multipath components) could lead to an increased rank/condition number of H. FIG. 6 depicts an example of a variable number of multipath components and implementation. FR2 support of 4-layer MIMO operation on a single panel with configurability through patch element selection that splits the HW antenna patch element usage in multiple patterns using pre-characterized data may achieve rank maximization. Thus, certain example embodiments discussed below are directed to improvements in computer-related technology.

In the context of multi-TRP at the base station, some example embodiments discussed below relate to single downlink control indicators, where a single code word may be multiplexed onto both TRPs at the base station (e.g., eNB, gNB) having 2 TRPs. As an example, periodic CSI-RS may have repetition set to "on" with reporting requirements, and/or CSI-RS with repetition set to "off" with no reporting requirements. There may be a maximum of 4 RI reported due to the FR2 use cases covered with single codeword transmission. The network may configure the UE with a CSI-ReportConfig with the higher layer parameter reportQuantity set to cri-RI-COI,' and/or the higher layer parameter groupBasedBeamReporting or groupBasedBeamReporting-r17, set to 'enabled.'

Certain example embodiments relate to FR2 4-layer downlink M-TRP, with a single code word transmitted and a single panel reception at the UE, as well as how the UE sweeps two narrow beams on the same panel. In particular, some example embodiments relate to how the UE front end configuration and antenna combining can help alleviate two typical spatial multiplexing multilayer reception challenges. Furthermore, the configuration of the UE patch antenna elements, and the UE front end phase shifters, may be used to maximize the number of simultaneous data streams that the system can send and receive. In the context of FR2 DL M-TRP single downlink control information (DCI) (with single code word), various example embodiments may maximize the degrees of freedom of the UE downlink estimated channel matrix, define how to obtain highest number of spatial multiplexing layers to be received and decoded, and define how to maximize the reported rank indicator value from the UE to a base station.

Figures 7A, 7B, 7C:
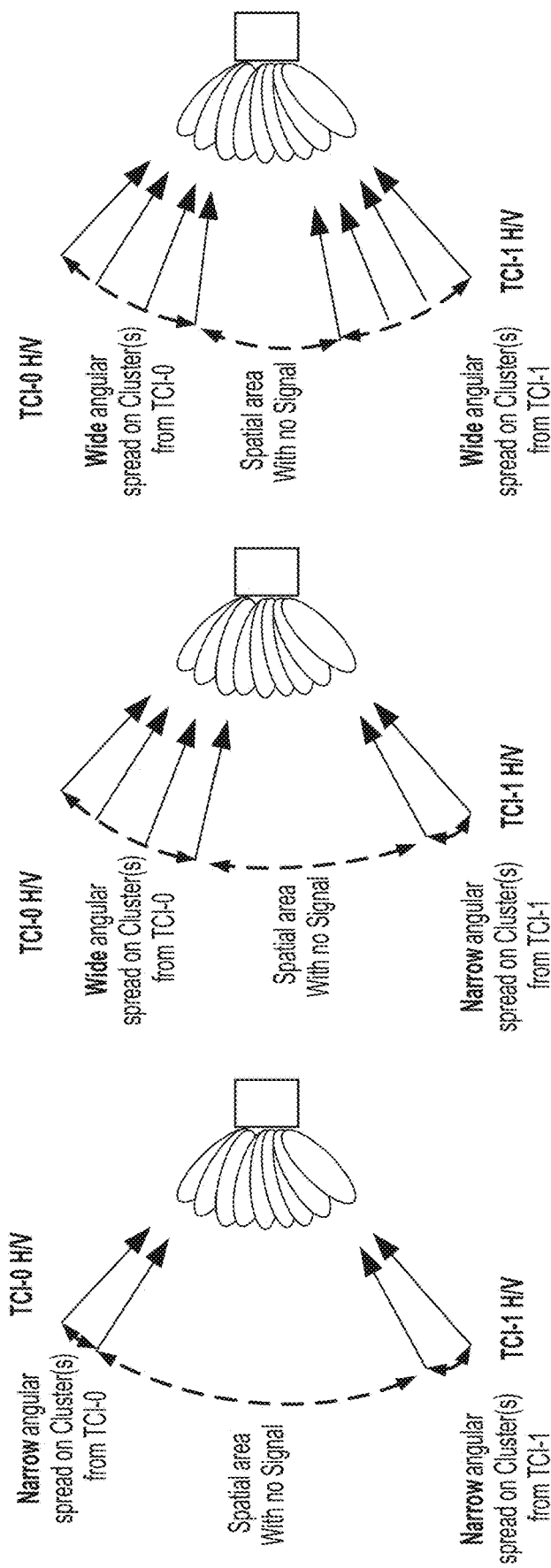
FIG. 7A illustrates an example of narrow-narrow angular spread per TCI.
FIG. 7B illustrates another example of narrow-wide angular spread per TCI.
FIG. 7C illustrates another example of wide-wide angular spread per TCI.

Certain example embodiments discussed herein relate to UE mmWave single panel operation in multi-RX (or 4-layer MIMO) context. Based on the alignment procedure, the UE may acknowledge the configuration required for 4-layer MIMO reception on a single panel. In general, the UE may first perform a sweep of narrow beams on the active panel, typically using on one or multiple aperiodic bursts of CSI-RS with repetition set to ON (similar to "phase 3" procedure in FIG. 2). Alternatively, other reference signals could be considered as well for the narrow beam sweep at the UE, such as SSBs or DM-RS. During the sweep, at each orthogonal frequency-division multiplexing (OFDM) symbol with reference signals, the UE may estimate a channel impulse response (CIR) or power delay profile (PDP) of the radio channel, and extracts information related to MPCs and/or MPCLs about the radio channel for each narrow beam. Some example embodiments may estimate a variety of key performance indicators (KPIs), such as per TCI-layer radio channel angular coverage; per TCI-layer number of CIR delay components; per TCI-layer power of the individual CIR delay components; and per TCI-layer aggregate power of all CIR delay components. FIGS. 7A-C illustrates several different radio channel use case examples where the UE performs a narrow beam sweep on the active panel in order to estimate these types of KPIs for each TCI-layer. In particular, FIG. 7A depicts a narrow-narrow angular spread per TCI; FIG. 7B depicts a narrow-wide angular spread per TCI; and FIG. 7C depicts a wide-wide angular spread per TCI.

Once the UE has swept the narrow beams, based on the KPI collection describing the radio channel use case estimated in phase 1 of FIG. 2, the UE may attempt to match and optimize its mmWave frontend antenna module settings such that the beamwidth of a group of antenna elements in the steered direction captures all the MPC above a power threshold. Radio channel use cases may include, but are not limited to, wide-wide (i.e., angular spread per TCI signal), narrow-narrow, and narrow-wide. For example, some key control parameters that the UE beam configuration module could control include the array configuration (e.g., via selection of antenna elements to combine per Rx layer); beam steering direction (e.g., via phase and amplitude control per antenna element branch); beam width (e.g., via phase and amplitude control per antenna element branch); and beam gain (e.g., via phase and amplitude control per antenna element branch). As a result, a group of antenna elements may be controlled to direct at least one beam; the values of phase shifters may form a desired beamwidth and direct the beam in different directions with the elements chosen for the group.

The UE may then apply the optimal antenna panel configuration for angular coverage towards the found clusters, where β (i.e., UE Rx antenna gain for a given beam and a given direction) optimization may additionally account for the multipath richness to maximize rank. The UE may know the angular coverage of the stored antenna configurations, and of the β matching through comparison of measured signal strength (and potentially SINR). the UE may match this to pre-characterized (factory characterized) antenna panel configurations that contain a set of configurations that the UE can apply for 4-Layer MIMO support, providing angular spread at different antenna gain profiles.

Figure 8:
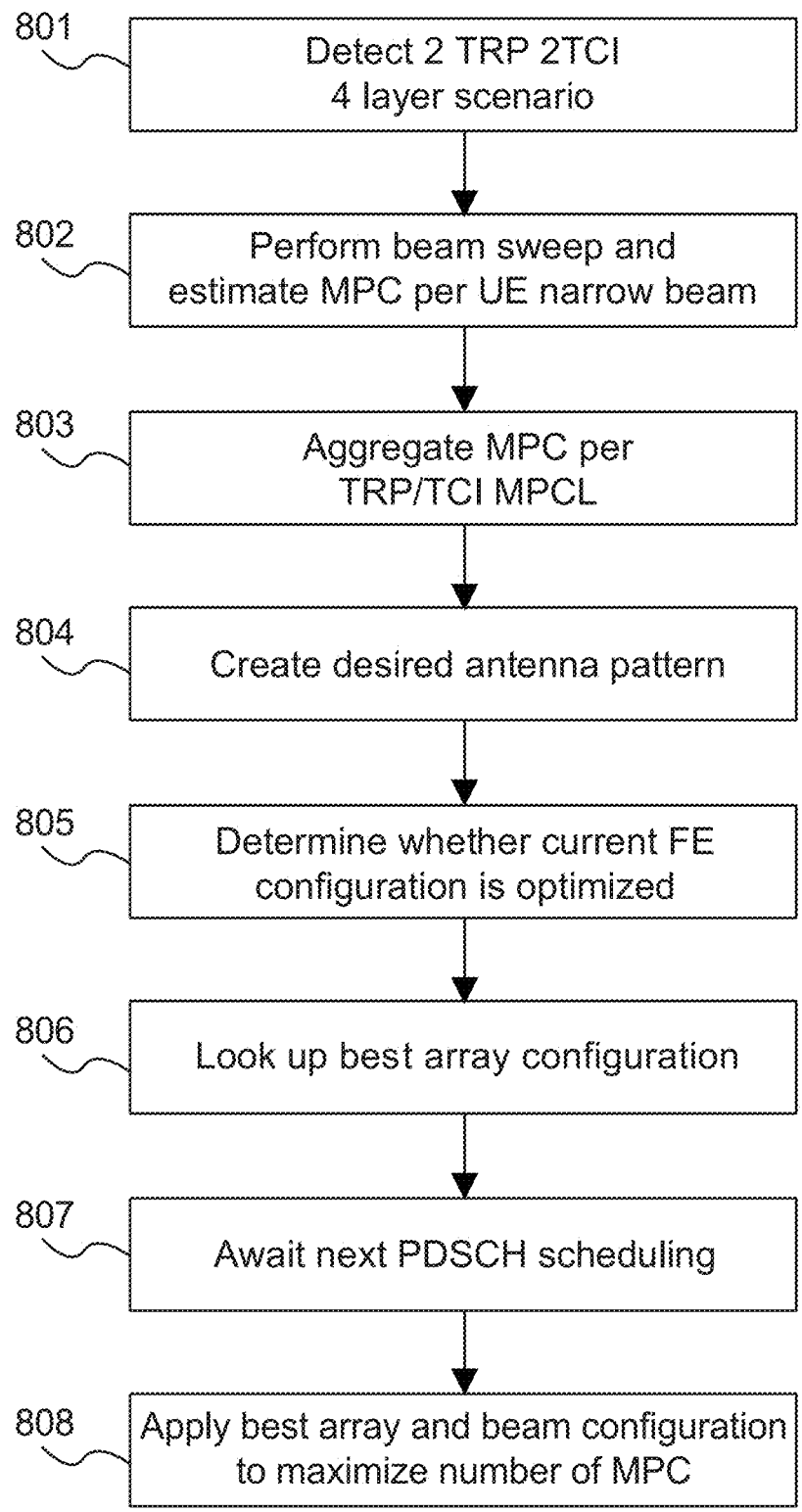
FIG. 8 illustrates an example of a flow diagram of a method according to various example embodiments.
Figure 16:
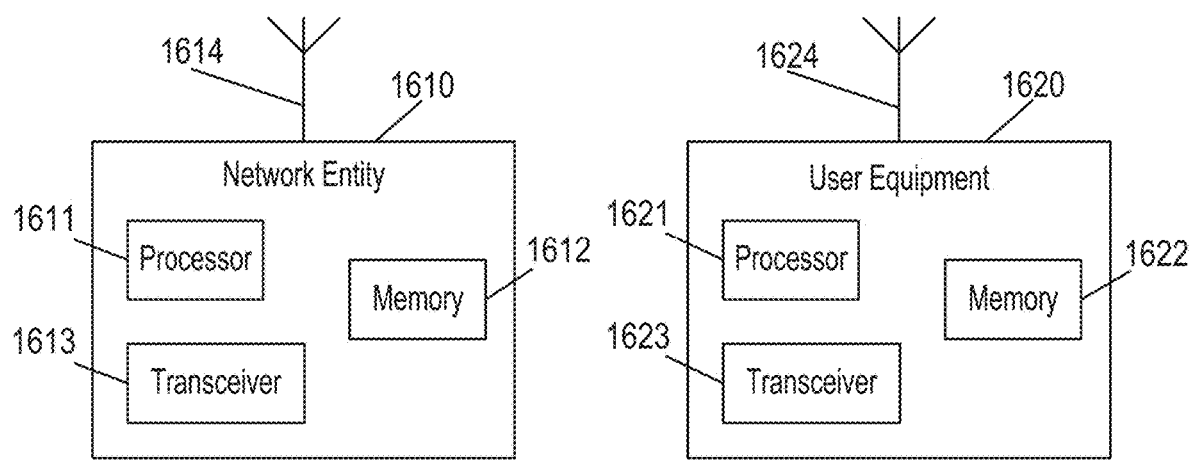
FIG. 16 illustrates an example of various network devices according to some example embodiments.

FIG. 8 illustrates an example of a flow diagram of a method that may be performed by a UE, such as UE 1620 illustrated in FIG. 16, according to various example embodiments. In particular, FIG. 8 depicts a split panel antenna configuration mode of operation.

At 801, the method may include detecting a 2-TRP, 2-TCI, 4-layer scenario that was the best received on a single active panel. For example, parameter CORESETPoolIndex may be used to distinguish which beams are received from which TRP; the UE may assume that all the data scheduled by physical downlink control channel (PDCCH) in CORESETs with the same CORESETPoolIndex are received from the same TRP. A TCI state configuration may be transmitted dynamically in a DCI message, and may include configurations such as quasi co-location (QCL)-relationships between the DL reference signals (RSs) in one CSI-RS set and the PDSCH demodulation reference signal (DMRS) ports. The UE may be configured with a list of up to "M" TCI state configurations within the higher layer (e.g., RRC Reconfiguration) parameter PDSCH-Config to decode PDSCH according to a detected PDCCH with DCI intended for the UE and the given serving cell. In addition, DCI (e.g., DCI format 0_1) may include a field of up to 6 bits dedicated to precoding information and number of layers. As an example, the method may also include receiving at an antenna panel at least two configured transmission configuration indicator states for simultaneous MIMO reception.

As used in some example embodiments described herein, a TCI-state may refer to a QCL source and QCL type for a target reference signal, and therefore may indicate a transmission configuration that can include QCL-relationships between the DL RSs in one RS set. Furthermore, each TCI-state may include parameters for configuring a QCL relationship between one or two DL RSs, and the DM-RS ports of the PDSCH, the DM-RS port of PDCCH, and/or the CSI-RS port(s) of a CSI-RS resource.

At 802, the method may include performing beam sweeping and/or estimating MPC per UE narrow beam. In particular, a narrow beam scan may be performed per TCI layer pair on the single best panel. MPC may also be estimated per UE narrow beam, thereby detecting at least one radio channel cluster per TCI layer pair. For each of at least two configured TCI states for simultaneous DL reception from one or more TRPs, the method may include sweeping at least one narrow beam receiving a plurality of repeated CSI-RS received from a base station.

Figure 9:
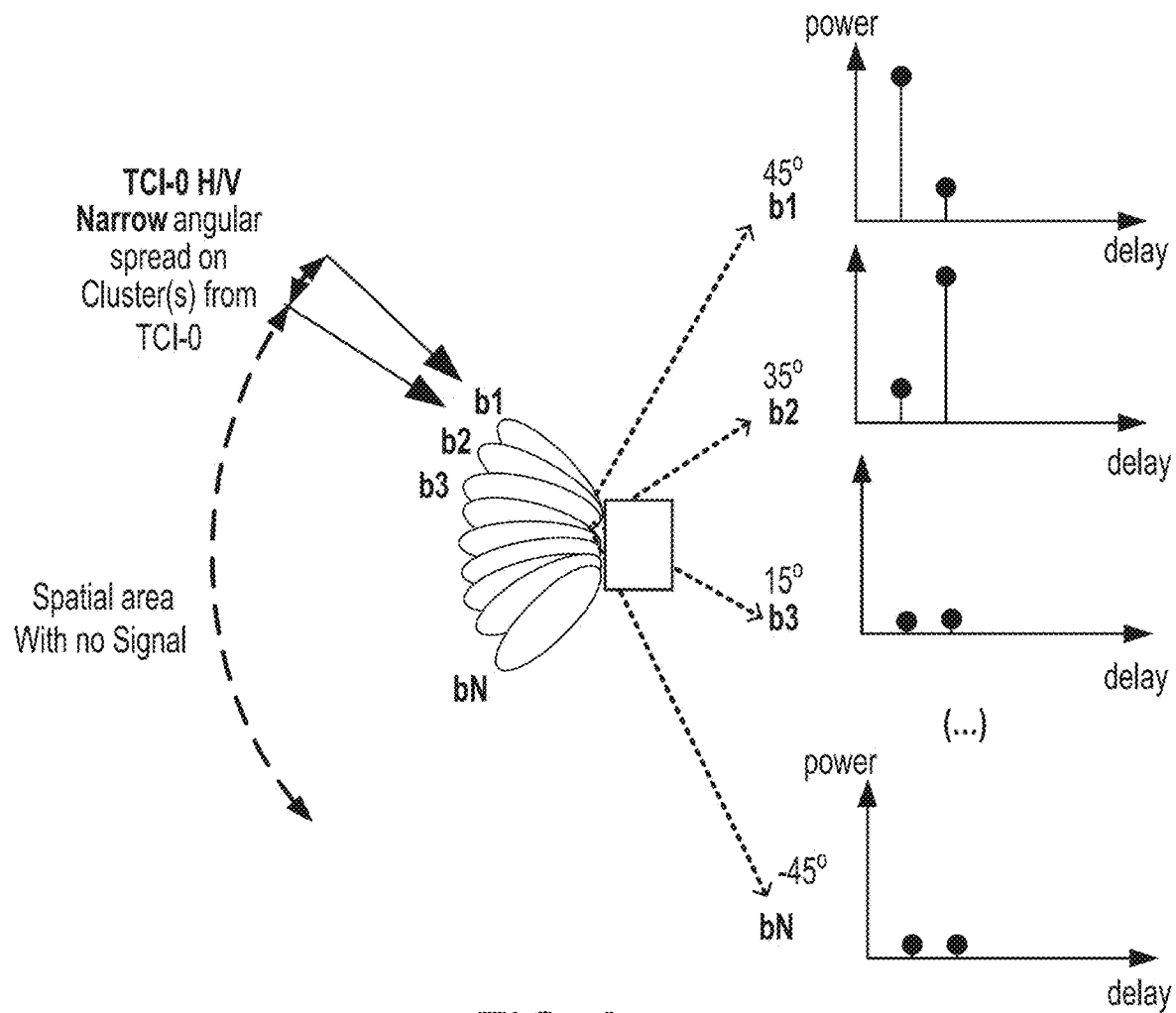
FIG. 9 illustrates an example of UE narrow beam sweeping using a per beam multipath component (MPC)/multipath cluster (MPCL) estimation according to various example embodiments.

In some example embodiments, such as during phase 3 in FIG. 2, the method may include selecting a narrow beam setting to receive an OFDM symbol containing the beam training CSI-RS spread across the width of the physical resource blocks (PRBs) allocated by a base station, such as NE 1610 illustrated in FIG. 16, according to various example embodiments. The base station may fix a beam (i.e., transmit the same beam repeatedly); the UE that supports beamforming may refine its receiver beam, and set a spatial filter on the receiver antenna array (i.e., receiving repeated RSs). Phase 3 in FIG. 2 may enable UE measurements on the same TRP Tx beam to change UE Rx beams if the UE uses beamforming. As shown in FIG. 9, from the reception of those CSI-RSs, the UE may estimate, for each narrow beam ($b_1$, $b_2$, $b_3$, . . . , $b_N$) an associated radio multipath channel in the delay domain with several significant MPCs or MPCL. This process may be carried out for each active TCI carrying reference symbols for narrow beam training/tracking on each TRP.

At 803, the method may include aggregating MPC per TRP/TCI MPCL. For example, MPC may be aggregated per TRP/TCI MPCL by estimating the KPIs describing receive channel conditions including any of: radio channel angular spread per TCI-layer pair; the number of MPC delay components per cluster/TCI-layer pair; the power of the individual CIR delay components; and the aggregate power of all CIR delay components (per TCI-layer pair).

Figure 10:
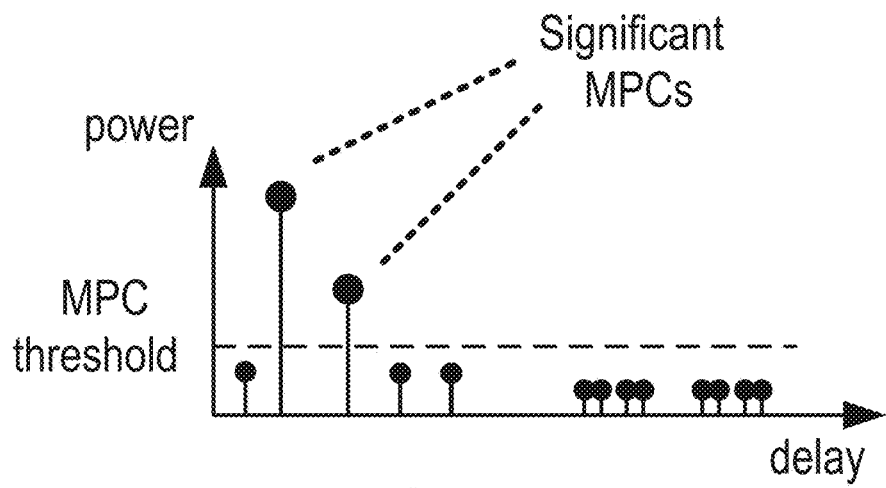
FIG. 10 illustrates MPC detection measured in a delay domain from channel state information reference signal (CSI-RS) in frequency domain according to certain example embodiments.
Figure 11:
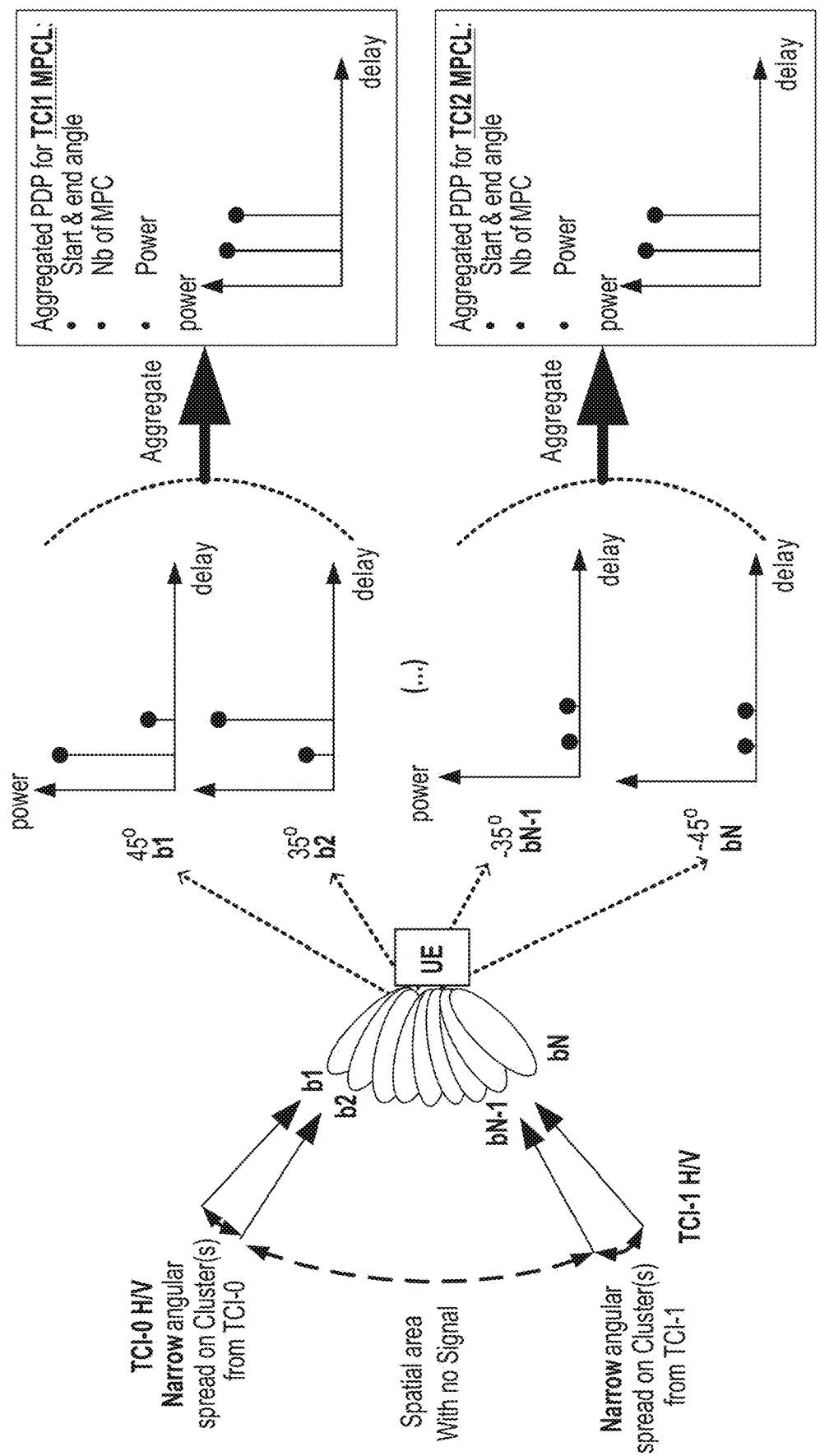
FIG. 11 illustrates an example of aggregation per transmission configuration indicator (TCI) according to some example embodiments.
Figure 12B:
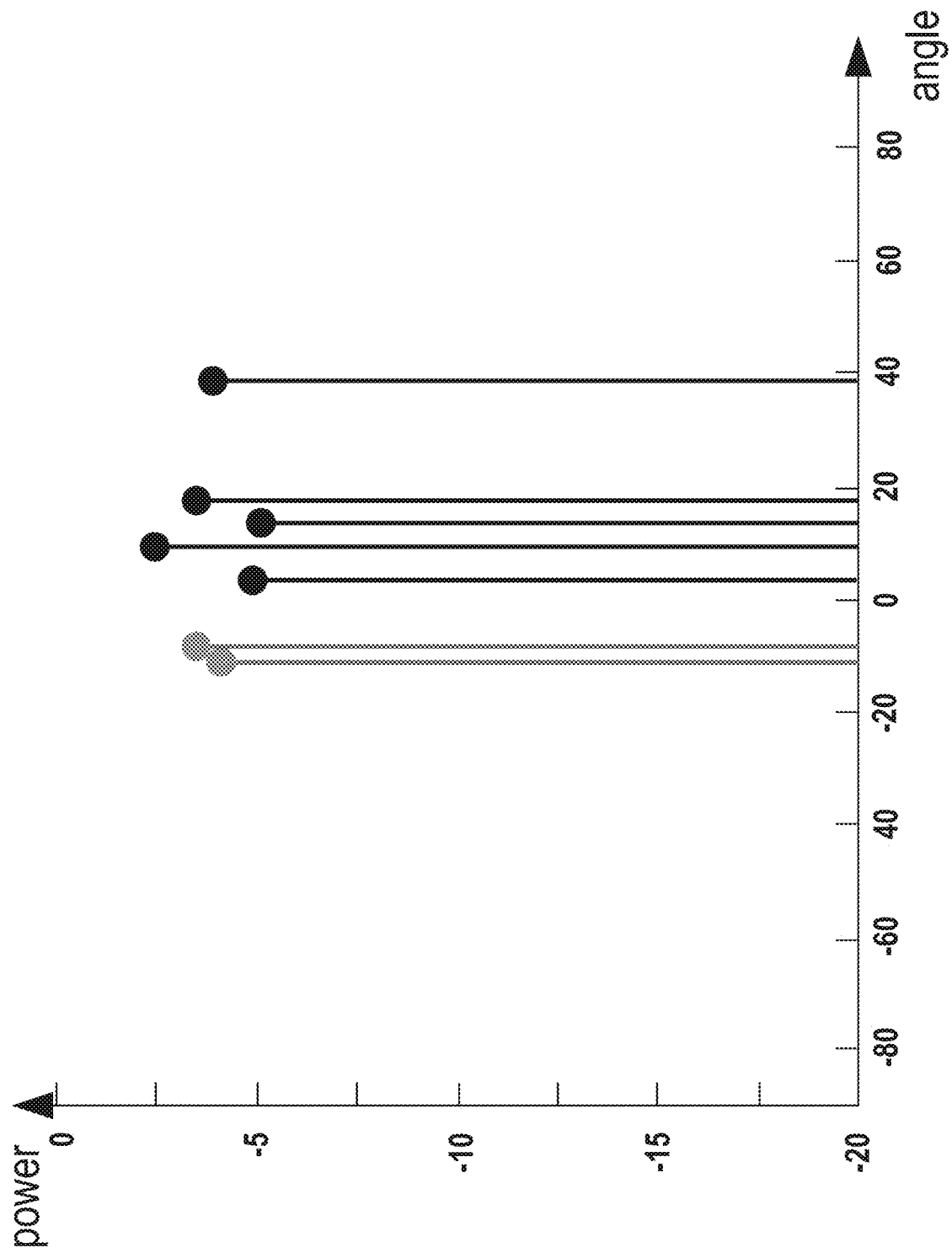
FIG. 12B depicts another example of aggregated channel PAPs per TCI according to certain example embodiments.
Figure 12C:
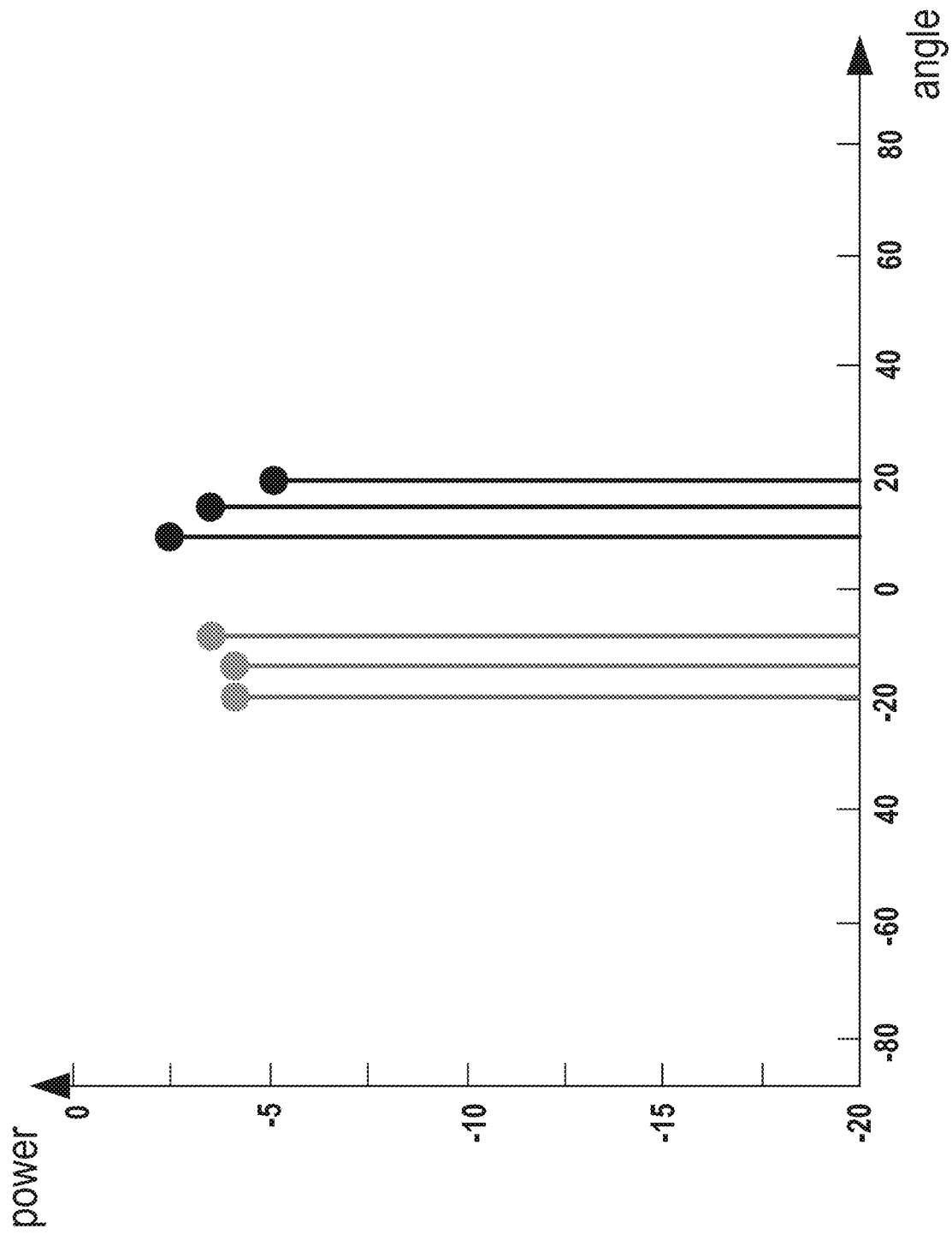
FIG. 12C depicts another example of aggregated channel PAPs per TCI according to certain example embodiments.
Figure 12D:
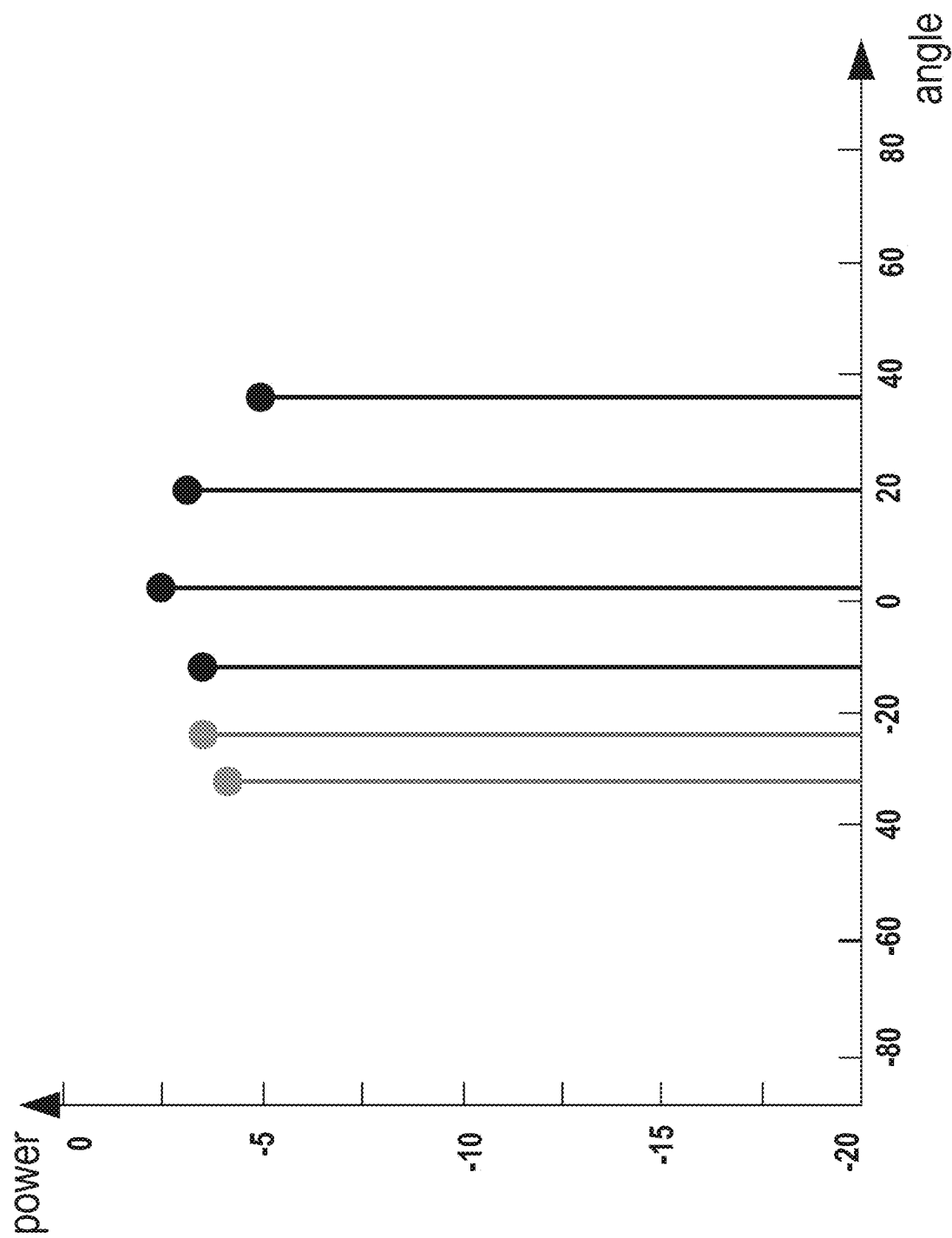
FIG. 12D depicts another example of aggregated channel PAPs per TCI according to certain example embodiments.

The method may include counting the number of channel components per narrow beam by considering the MPCs (i.e., significant MPCs) with a power level above an "MPC threshold" (or delta from max power of strongest MPC), as depicted in FIG. 10. Once each "significant MPC" is detected, the method may include aggregating those significant MPCs into a "TRP/TCI PDP" by aggregating all MPCs from all narrow beams, and for a given delay or delay range selecting the strongest beams with power above the MPC threshold. This process may enable the UE to estimate parameters (e.g., TRP/TCI MPCL angular spread, TRP/TCI MPCL number of significant MPCs, and power of aggregated TRP/TCI MPCL). This may also allow the UE to describe each TRP/TCI MPCL in a compressed way by providing for the key input to the array element selection and configuration. FIG. 11 depicts this process, where two TRP/TCI MPCL are estimated via the UE narrow beam sweep. FIG. 12 also depicts four examples of these aggregated PAPs with the significant MPCs; specifically, FIG. 12A depicts a wide-wide radio channel multipath profile, FIG. 12B depicts a narrow-wide radio channel multipath profile, FIG. 12C depicts a narrow-narrow radio channel multipath profile, and FIG. 12D depicts another narrow-wide radio channel multipath profile.

Figure 13A:
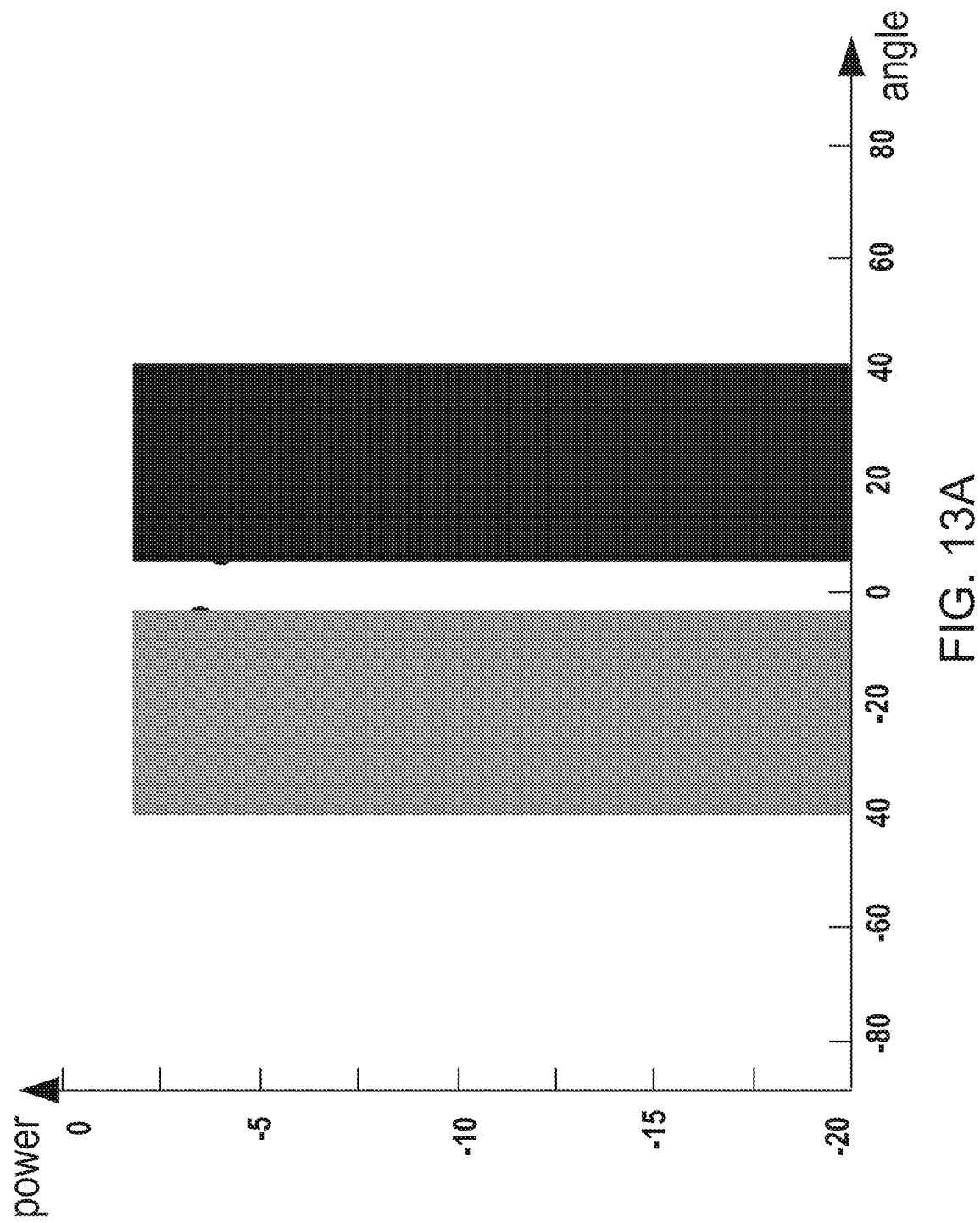
FIG. 13A illustrates an example of desired antenna angular ranges according to various example embodiments.
Figure 13D:
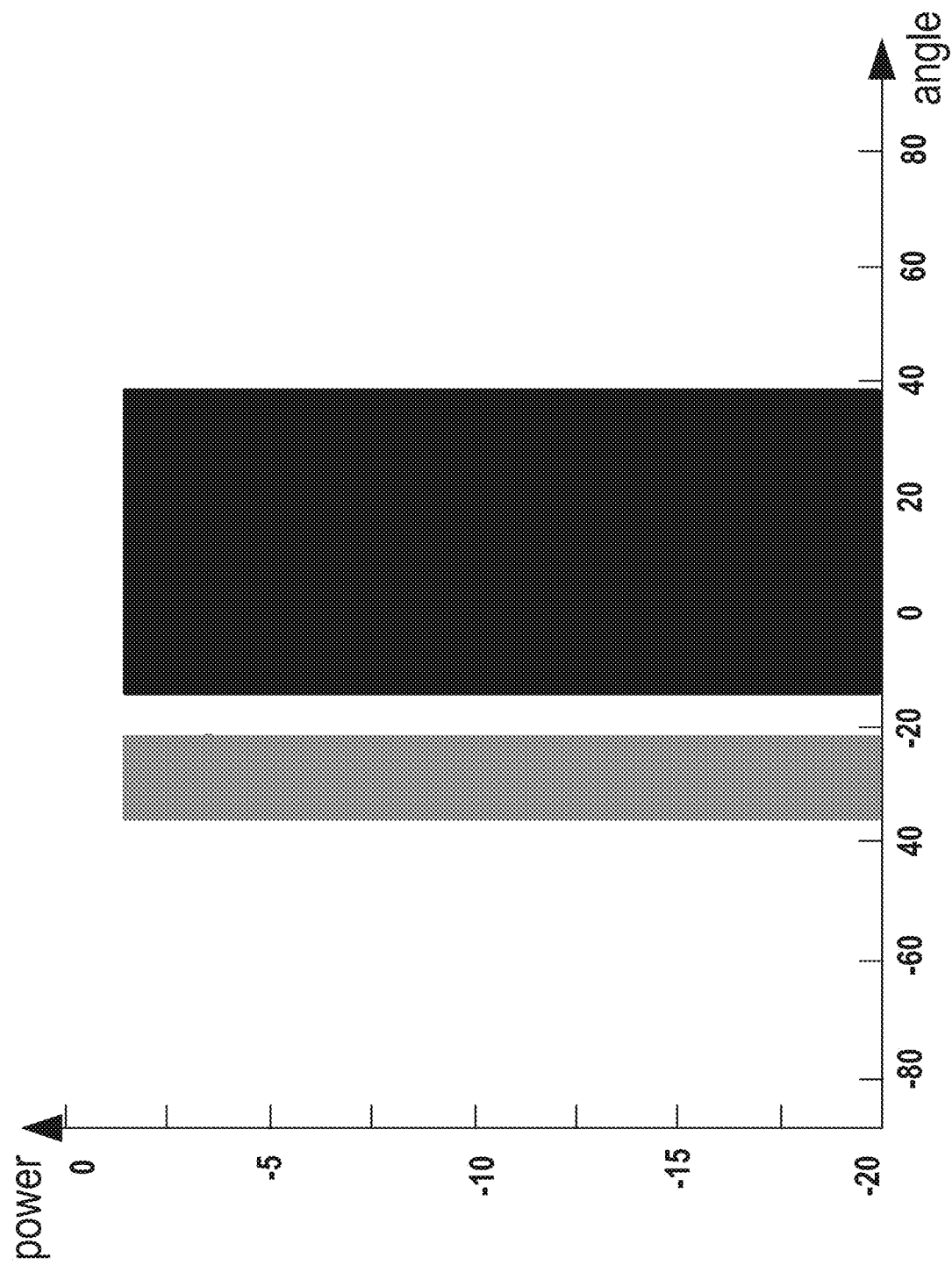
FIG. 13D illustrates another example of desired antenna angular ranges according to various example embodiments.

At 804, the method may include creating a desired antenna pattern for each TCI-layer pair. In particular, the method may include creating the desired antenna pattern for each TCI-layer pair. This desired antenna pattern may consist of a starting and end angle within the possible angular spreads achievable by the UE array. The start and end angles may be within the HPBW of the radiation pattern of the beam. FIG. 13 shows several examples of desired antenna ranges matching the PAPs (as shown in FIG. 12), wherein the beamwidth of the group of antenna elements in a steered direction captures all the MPC above a power threshold.

At 805, the method may include determining whether the current front end (FE) configuration is optimized, for example, by checking if the current mmWave antenna array module configuration corresponds with the desired antenna pattern obtained at 804. If the antenna module settings are already optimal, the method may include maintaining an antenna module configuration until the next narrow beam sweep. However, if a configuration is available for a better match of the KPIs of the channel, the method may perform an improved look-up for optimal configuration, as performed in the following step.

Figure 14:
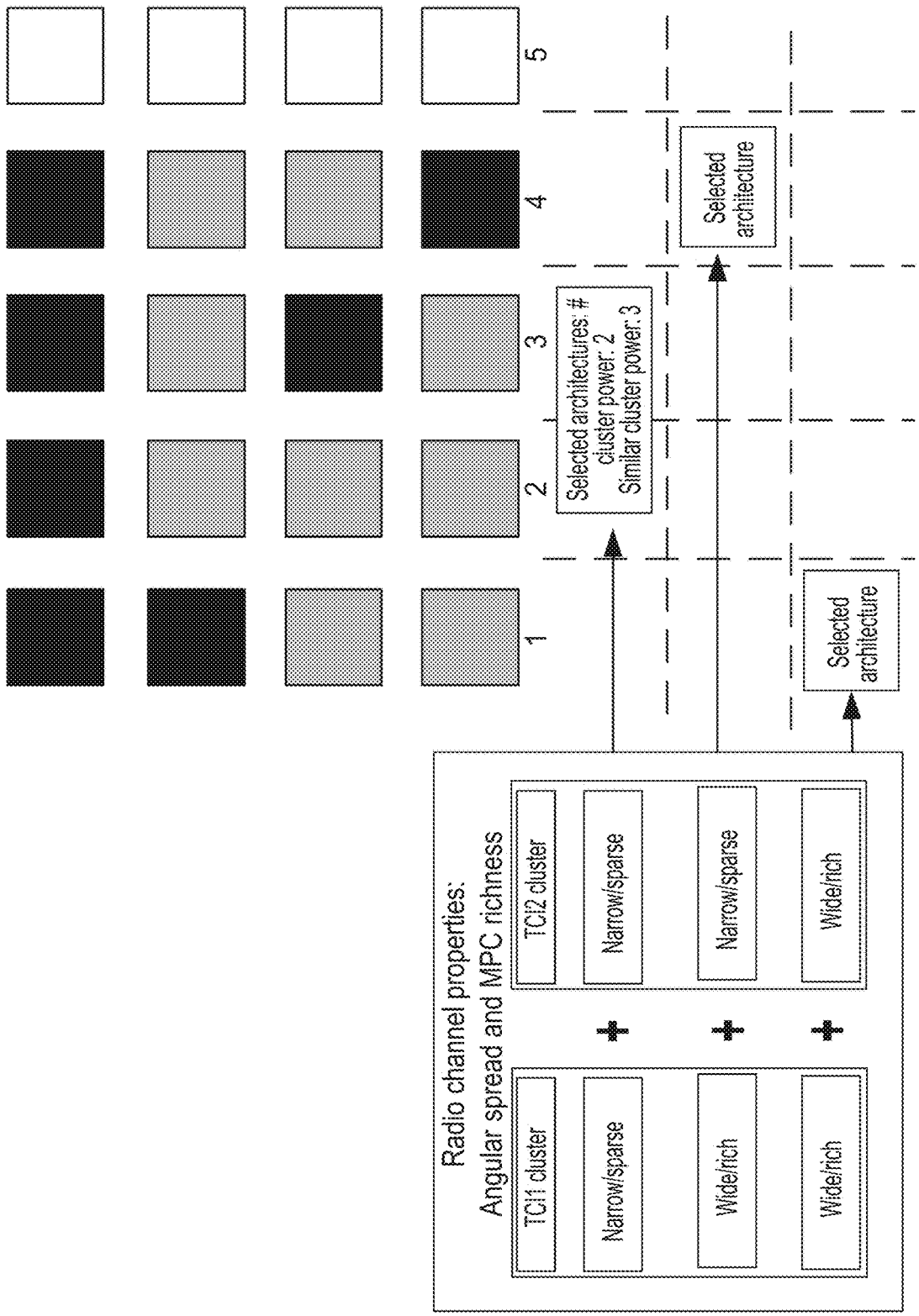
FIG. 14 illustrates an example configuration search depending on the cluster (CL) angular spread.
Figure 15A:
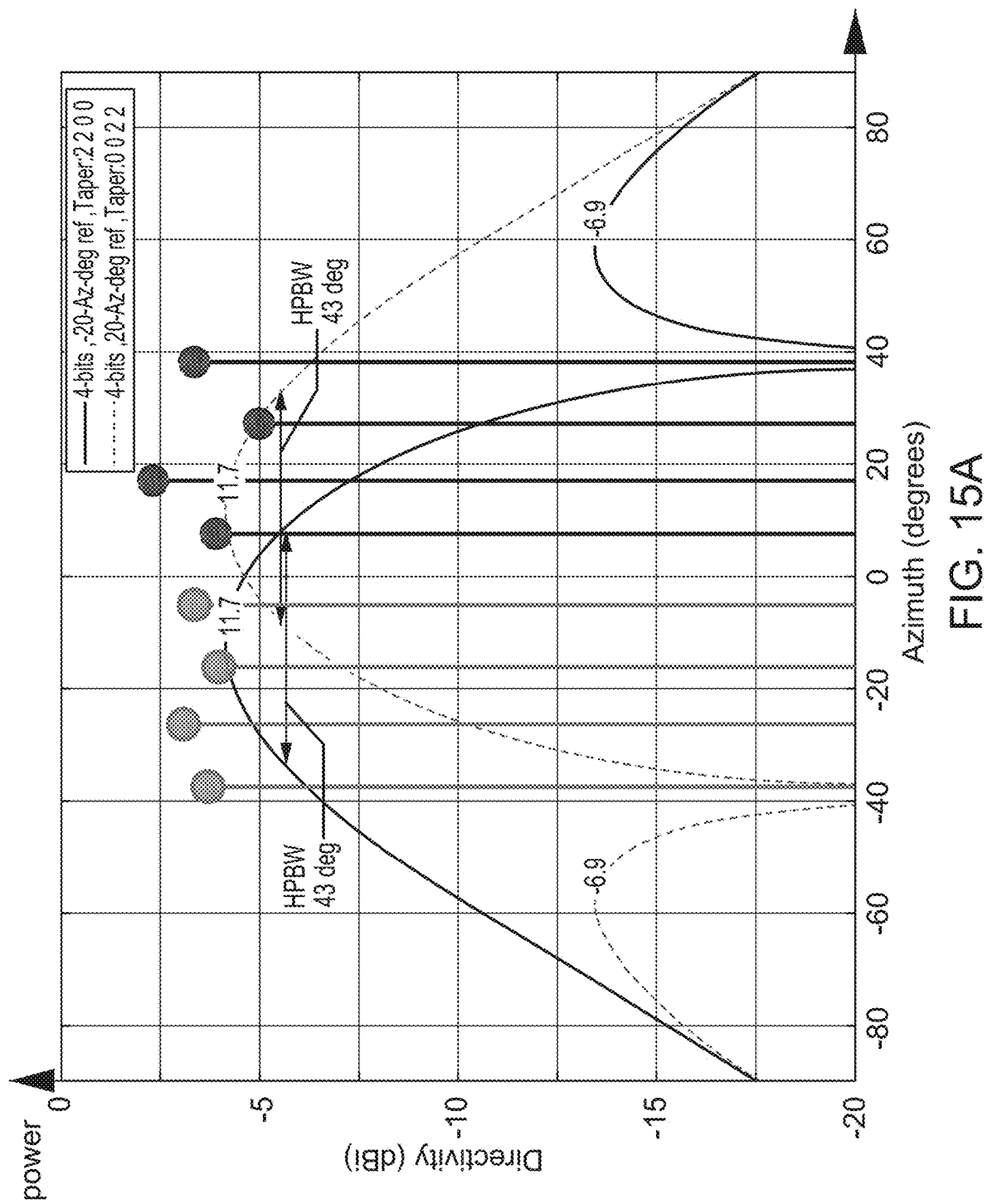
FIG. 15A depicts an example of final applied beams on the estimated PAPs according to various example embodiments.
Figure 15B:
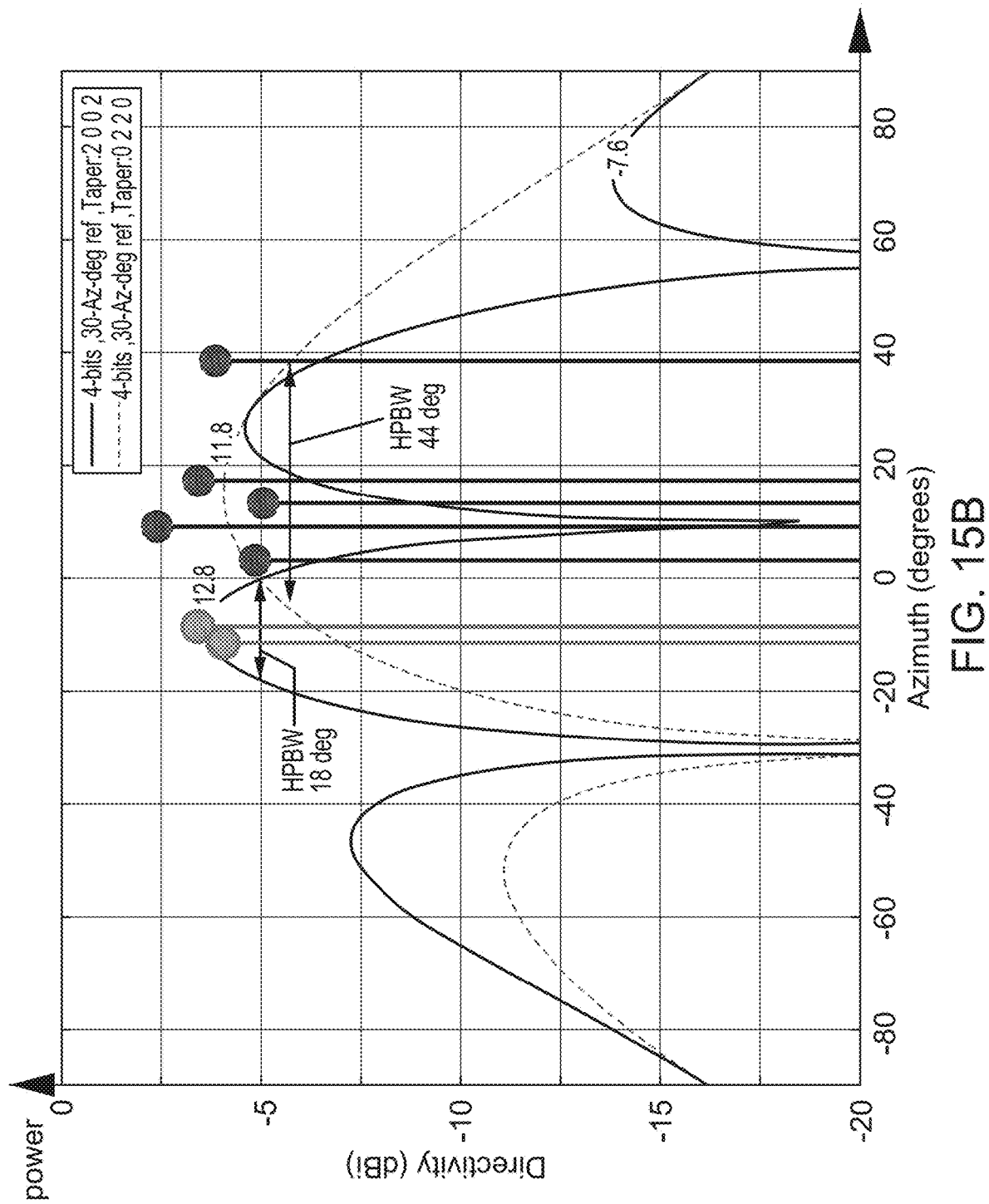
FIG. 15B depicts another example of final applied beams on the estimated PAPs according to various example embodiments.
Figure 15C:
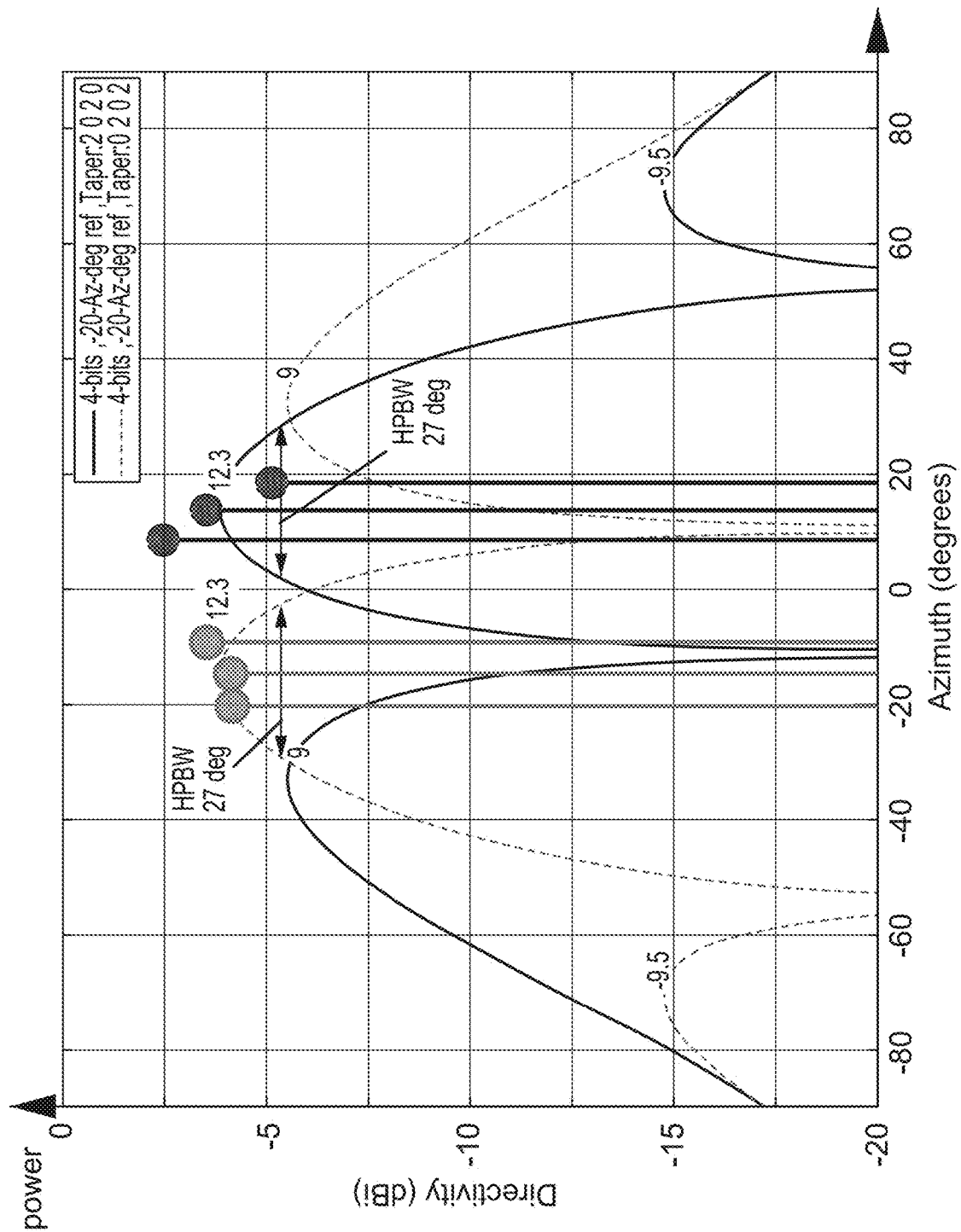
FIG. 15C depicts another example of final applied beams on the estimated PAPs according to various example embodiments.
Figure 15D:
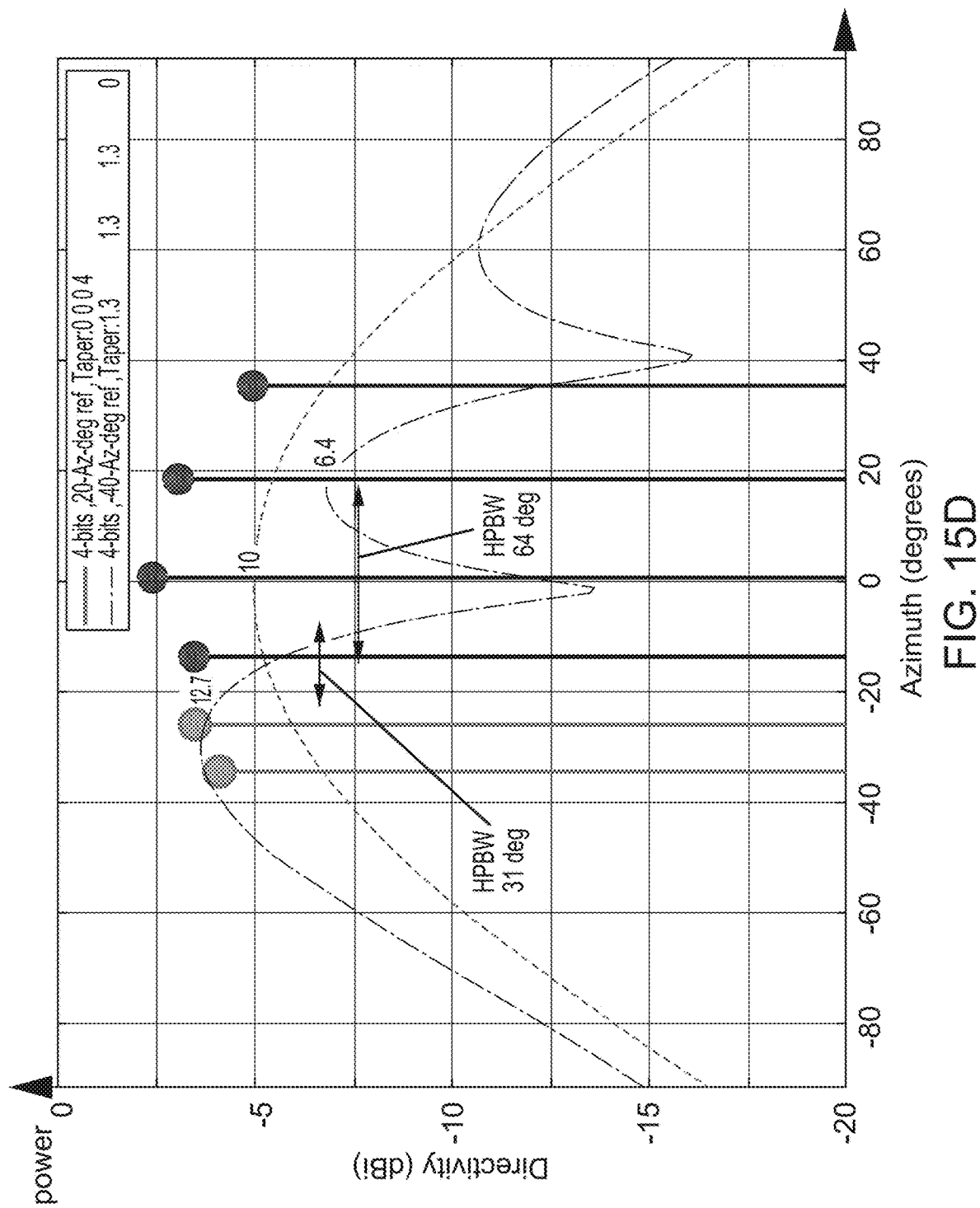
FIG. 15D depicts another example of final applied beams on the estimated PAPs according to various example embodiments.

At 806, the method may include looking up best array configurations, such as in a table (e.g., a lookup table stored in UE ROM). For example, referring back to FIGS. 5A-D, depending on the array combination selected, several different angular and steering capabilities may be provided. As an example, Config1 of array element 1100-0011 grouping may correspond with HPBW of 43 degrees for both beams; Config2 or array element 1000-0001 grouping may correspond with HPBW of 18 and 44 degrees for each beam; Config3 of array element 1010-0101 grouping may correspond with HPBW of 27 degrees for both beams; and Config4 of array element 1001-1001 grouping may correspond with HPBW of 31 and 64 degrees for each beam. Based on the desired antenna beamwidth per TCI-layer-pair, the best array element grouping may be selected, as shown in FIG. 14.

At 807, the method may include awaiting a next scheduled PDSCH.

At 808, the method may include applying the best array and beam configuration to maximize a number of MPCs. For example, upon an event trigger (e.g., UE is informed via a control resource set (CORESET) about when it will receive the next series of data packets, such as in a PDSCH channel), the method may include applying the antenna configuration estimated in 806, where the two sub-arrays aim at maximizing the number of MPC per beam (like next RX PDSCH slot).

In various example embodiments, the method may include, based upon at least one spatial radio multipath channel characteristic of the reference signals carrying each transmission configuration indicator, selecting at least one antenna element of the antenna panel to form a group of antenna elements and control the group of antenna elements to form at least one beam. Furthermore, some example embodiments may include matching at least one array beam pattern of the antenna panel to at least one channel environment such that the beamwidth of the group of antenna elements in the steered direction captures all the MPC above a power threshold (i.e., a group of elements may be controlled to form a beam which beamwidth captures all the multipath components (e.g., above a power threshold) supported by the environment). In particular, spatial radio multipath channel characteristics may be related to PAPs (e.g., profile azimuth profile) for each of these tasks. For example, FIGS. 15A-D depict an example of the antenna configuration matches the estimated PAPs, wherein spatial radio multipath channel characteristic/radio channel conditions (i.e., power angular profiles) are overlapped with the radiation patterns from the optimized array reconfiguration to maximize the performance of the radio channel. In particular, the radiation patterns of the UE antenna arrays may overlap with the radio channel PAPs in some example embodiments of both radio channel, but also matching antenna array and beam configurations.

FIG. 16 illustrates an example of a system according to certain example embodiments. In one example embodiment, a system may include multiple devices, such as, for example, network entity (NE) 1610 and/or UE 1620.

NE 1610 may be one or more of a base station, such as an eNB or gNB, a serving gateway, a server, and/or any other access node or combination thereof.

NE 1610 may further comprise at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a $5^{th}$ generation core (5GC).

UE 1620 may include one or more of a mobile device, such as a mobile phone, smart phone, personal digital assistant (PDA), tablet, or portable media player; vehicle, such as an automobile and truck; digital camera; pocket video camera; video game console; navigation unit, such as a global positioning system (GPS) device; desktop or laptop computer; single-location device, such as a sensor or smart meter; or any combination thereof. Furthermore, NE 1610 and/or UE 1620 may be one or more of a citizens broadband radio service device (CBSD).

NE 1610 and/or UE 1620 may include at least one processor, respectively indicated as 1611 and 1621. Processors 1611 and 1621 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1612 and 1622. The memory may be fixed or removable. The memory may include computer program instructions or computer code contained therein. Memories 1612 and 1622 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1611 and 1621, memories 1612 and 1622, and any subset thereof, may be configured to provide means corresponding to the various blocks of FIGS. 7-15. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 16, transceivers 1613 and 1623 may be provided, and one or more devices may also include at least one antenna, respectively illustrated as 1614 and 1624. The device may have many antennas, such as an array of antennas configured for multiple input multiple output (MIMO) communications, or multiple antennas for multiple RATs. Other configurations of these devices, for example, may be provided. Transceivers 1613 and 1623 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 7-15). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 7-15. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 17:
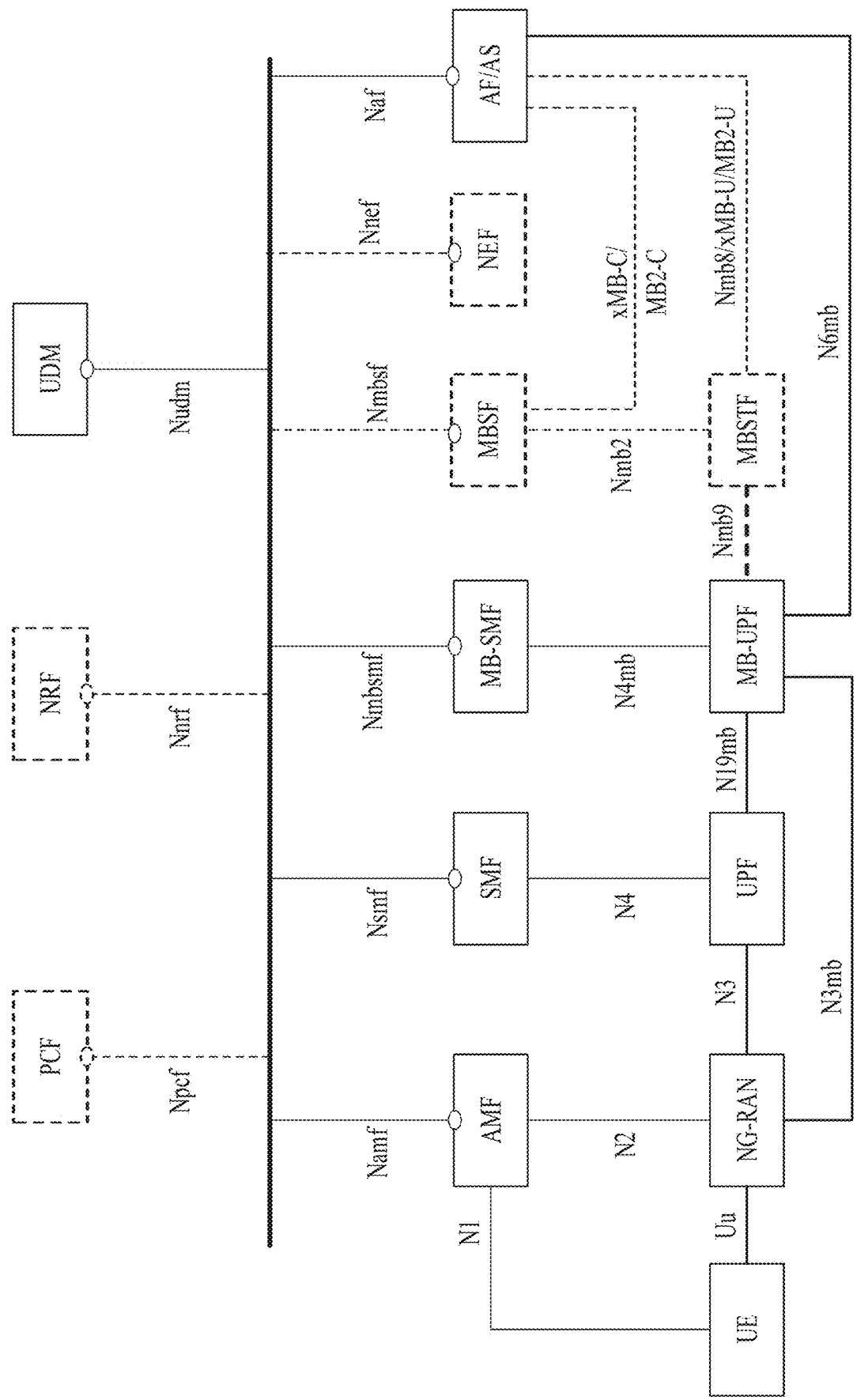
FIG. 17 illustrates an example of a 5G network and system architecture according to certain example embodiments.

FIG. 17 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 17 may be similar to NE 1610 and UE 1620, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

According to certain example embodiments, processors 1611 and 1621, and memories 1612 and 1622, may be included in or may form a part of processing circuitry or control circuitry. In addition, in some example embodiments, transceivers 1613 and 1623 may be included in or may form a part of transceiving circuitry.

In some example embodiments, an apparatus (e.g., NE 1610 and/or UE 1620) may include means for performing a method, a process, or any of the variants discussed herein. Examples of the means may include one or more processors, memory, controllers, transmitters, receivers, and/or computer program code for causing the performance of the operations.

In various example embodiments, apparatus 1610 may be controlled by memory 1622 and processor 1621 to receive, at an antenna panel, at least two configured transmission configuration indicator states for simultaneous multiple input multiple output reception; for each of the at least two configured transmission configuration indicator states for simultaneous reception from one or more transmission reception points, sweep at least one narrow beam receiving one or more repeated reference signals received from the one or more transmission reception points; and, based upon at least one spatial radio multipath channel characteristic of the one or more repeated reference signals carrying each transmission configuration indicator state, select at least one antenna element of the antenna panel to form a group of antenna elements and control the group of antenna elements to at least one beam.

Certain example embodiments may be directed to an apparatus that includes means for performing any of the methods described herein including, for example, means for receiving, at an antenna panel, at least two configured transmission configuration indicator states for simultaneous multiple input multiple output reception; means for, for each of the at least two configured transmission configuration indicator states for simultaneous reception from one or more transmission reception points, sweeping at least one narrow beam receiving one or more repeated reference signals received from the one or more transmission reception points; and means for, based upon at least one spatial radio multipath channel characteristic of the one or more repeated reference signals carrying each transmission configuration indicator state, selecting at least one antenna element of the antenna panel to form a group of antenna elements and control the group of antenna elements to direct at least one beam.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

| Partial Glossary | |
|---|---|
| 3GPP | 3$^{rd}$ Generation Partnership Project |
| 5G | 5$^{th}$ Generation |
| 5GC | 5$^{th}$ Generation Core |
| 6G | 6$^{th}$ Generation |
| AF | Application Function |
| AMF | Access and Mobility Management Function |
| AoA | Angle of Arrival |
| ARQ | Automatic Repeat Request |
| ASIC | Application Specific Integrated Circuit |
| BLER | Block Error Rate |

| Partial Glossary -continued | |
|---|---|
| BS | Base Station |
| CBSD | Citizens Broadband Radio Service Device |
| CE | Control Elements |
| CIR | Channel Impulse Response |
| CG | Configured Grant |
| CL | Cluster |
| CN | Core Network |
| CORESET | Control Resource Set |
| CPU | Central Processing Unit |
| CQI | Channel Quality Indicator |
| CRI | Channel State Information Resource Indicator |
| CSI | Channel State Information |
| CSI-RS | Channel State Information Reference Signal |
| CU | Centralized Unit |
| DCI | Downlink Control Information |
| DL | Downlink |
| DMRS | Demodulation Reference Signal |
| DU | Distributed Unit |
| eMBB | Enhanced Mobile Broadband |
| eMIMO | Enhanced Multiple Input Multiple Output |
| eNB | Evolved Node B |
| FE | Front End |
| FR | Frequency Range |
| gNB | Next Generation Node B |
| GPS | Global Positioning System |
| HARQ | Hybrid Automatic Repeat Request |
| HDD | Hard Disk Drive |
| HPBW | Half Power Beam Width |
| IoT | Internet of Things |
| KPI | Key Performance Indicator |
| LTE | Long-Term Evolution |
| LTE-A | Long-Term Evolution Advanced |
| MEMS | Micro Electrical Mechanical System |
| MIMO | Multiple Input Multiple Output |
| mMTC | Massive Machine Type Communication |
| MPC | Multipath Components |
| MPCL | Multipath Cluster |
| MPUE | Multi Panel User Equipment |
| NAS | Non-Access Stratum |
| NB-IoT | Narrowband Internet of Things |
| NE | Network Entity |
| NG | Next Generation |
| NG-eNB | Next Generation Evolved Node B |
| NG-RAN | Next Generation Radio Access Network |
| NR | New Radio |
| NR-U | New Radio Unlicensed |
| NZP | Non-Zero Power |
| OFDM | Orthogonal Frequency Division Multiplexing |
| PAP | Power Angular Profile |
| PDA | Personal Digital Assistance |
| PDP | Power Delay Profile |
| PDSCH | Physical Downlink Shared Channel |
| PHY | Physical |
| PRACH | Physical Random Access Channel |
| PRB | Physical Resource Block |
| QCL | Quasi Co-Location |
| QoS | Quality of Service |
| RAM | Random Access Memory |
| RAN | Radio Access Network |
| RAT | Radio Access Technology |
| RE | Resource Element |
| RF | Radio Frequency |
| RI | Rank Indicator |
| ROM | Read-Only Memory |
| RRM | Radio Resource Management |
| RS | Reference Signal |
| RX | Receiver |
| SNR | Signal-to-Noise Ratio |
| SSB | Synchronization Signal Block |
| SSBRI | Synchronization Signal/Physical Broadcast Channel Resource Block Indicator |
| TCI | Transmission Configuration Indicator |
| TRP | Transmission Reception Point |
| Tx | Transmission |
| UE | User Equipment |
| UL | Uplink |

-continued

Partial Glossary

| | |
|---|---|
| UMTS | Universal Mobile Telecommunications System |
| UPF | User Plane Function |
| URLLC | Ultra-Reliable and Low-Latency Communication |
| UTRAN | Universal Mobile Telecommunications System Terrestrial Radio Access Network |

We claim:

1. An apparatus comprising:
   at least one processor; and
   at least one memory storing instructions that, when executed by the at least one processor, cause the apparatus at least to:
   receive, at an antenna panel, at least two configured transmission configuration indicator states for simultaneous multiple input multiple output reception;
   for each of the at least two configured transmission configuration indicator states for simultaneous reception from one or more transmission reception points, sweep at least one narrow beam receiving one or more repeated reference signals received from the one or more transmission reception points; and
   based upon at least one spatial radio multipath channel characteristic of the one or more repeated reference signals carrying each transmission configuration indicator state, select at least one antenna element of the antenna panel to form a group of antenna elements and control the group of antenna elements to direct at least one beam.

2. The apparatus of claim 1, wherein the at least one memory and the instructions, when executed by the at least one processor, further cause the apparatus at least to:
   match at least one array beam pattern of the antenna panel to at least one channel environment.

3. The apparatus of claim 1, wherein the one or more repeated reference signals comprises channel state information reference signals.

4. The apparatus of claim 1, wherein the group of antenna elements comprises non-consecutive antenna elements.

5. The apparatus of claim 1, wherein the group of antenna elements comprises consecutive antenna elements.

6. The apparatus of claim 1, wherein each of the one or more transmission reception points comprises at least one layer per transmission configuration indicator, and up to four layers in downlink.

7. The apparatus of claim 1, wherein each of the one or more transmission reception points is associated with at least one transmission configuration indicator.

8. The apparatus of claim 1, wherein the at least one memory and the instructions, when executed by the at least one processor, further cause the apparatus at least to:
   estimate a power delay profile or a channel impulse response received per narrow beam.

9. The apparatus of claim 1, wherein the at least one memory and the instructions, when executed by the at least one processor, further cause the apparatus at least to:
   based on the estimated power delay profile or channel impulse response received per narrow beam, determine an optimum user equipment receive beamwidth per transmission configuration indicator.

10. The apparatus of claim 1, wherein the at least one memory and the instructions, when executed by the at least one processor, further cause the apparatus at least to:
    based on the optimum user equipment received beamwidth per transmission configuration indicator, group one or more consecutive or non-consecutive antenna elements.

11. The apparatus of claim 1, wherein the at least one memory and the instructions, when executed by the at least one processor, further cause the apparatus at least to:
    determine that at least two configured transmission configuration indicator states are received on the same panel.

12. A method comprising:
    receiving, at an antenna panel, at least two configured transmission configuration indicator states for simultaneous multiple input multiple output reception;
    for each of the at least two configured transmission configuration indicator states for simultaneous reception from one or more transmission reception points, sweeping at least one narrow beam receiving one or more repeated reference signals received from the one or more transmission reception points; and
    based upon at least one spatial radio multipath channel characteristic of the one or more repeated reference signals carrying each transmission configuration indicator state, selecting at least one antenna element of the antenna panel to form a group of antenna elements and control the group of antenna elements to direct at least one beam.

13. The method of claim 12, further comprising:
    matching at least one array beam pattern of the antenna panel to at least one channel environment.

14. The method of claim 12, wherein the one or more repeated reference signals comprises channel state information reference signals.

15. The method of claim 12, wherein the group of antenna elements comprises non-consecutive antenna elements.

16. The method of claim 12, wherein the group of antenna elements comprises consecutive antenna elements.

17. The method of claim 12, wherein each of the one or more transmission reception points comprises at least one layer per transmission configuration indicator, and up to four layers in downlink.

18. The method of claim 12, wherein each of the one or more transmission reception points is associated with at least one transmission configuration indicator.

19. The method of claim 12, further comprising:
    estimating a power delay profile or a channel impulse response received per narrow beam.

20. The method of claim 12, further comprising:
    based on the estimated power delay profile or channel impulse response received per narrow beam, determining an optimum user equipment receive beamwidth per transmission configuration indicator.

21. The method of claim 12, further comprising:
    based on the optimum user equipment received beamwidth per transmission configuration indicator, grouping one or more consecutive or non-consecutive antenna elements.

22. The method of claim 12, further comprising:
    determining that at least two configured transmission configuration indicator states are received on the same panel.

23. A non-transitory computer readable medium comprising program instructions that, when executed by an apparatus, cause the apparatus to perform at least a method according to claim 12.

* * * * *